(12) United States Patent
Burchell et al.

(10) Patent No.: US 11,093,721 B2
(45) Date of Patent: Aug. 17, 2021

(54) APPARATUS AND METHOD FOR MONITORING AND COMMUNICATING DATA ASSOCIATED WITH A PRODUCT/ITEM

(71) Applicant: INFRATAB, INC., Oxnard, CA (US)

(72) Inventors: Jonathan Burchell, Essex (GB); Therese E. Myers, Los Angeles, CA (US); Stanton Kaye, Los Angeles, CA (US); Gary W. Pope, Agoura, CA (US)

(73) Assignee: INFRATAB, INC., Oxnard, CA (US)

( * ) Notice: Subject to any disclaimer, the term of this patent is extended or adjusted under 35 U.S.C. 154(b) by 0 days.

(21) Appl. No.: 16/573,986

(22) Filed: Sep. 17, 2019

(65) Prior Publication Data

US 2020/0082137 A1 Mar. 12, 2020

Related U.S. Application Data

(63) Continuation of application No. 15/914,212, filed on Mar. 7, 2018, now Pat. No. 10,467,444, which is a
(Continued)

(51) Int. Cl.
*G06K 7/00* (2006.01)
*G06K 7/10* (2006.01)
(Continued)

(52) U.S. Cl.
CPC ......... *G06K 7/10366* (2013.01); *G01K 1/024* (2013.01); *G01K 3/04* (2013.01); *G04F 10/00* (2013.01); *G06K 19/0717* (2013.01); *G06Q 30/06* (2013.01); *F25D 29/00* (2013.01); *F25D 2700/08* (2013.01)

(58) Field of Classification Search
CPC .......... G06K 7/10366; G06K 7/10396; G06K 7/10405; G06K 7/10415; G06K 7/10425; G06K 7/10435; G06K 7/10445; G06K 7/10465; G06K 7/10475; G06K 19/07309; G06K 19/07318; G06K 19/07327; G06K 19/07336; G06K 19/07345; G06K 19/07354; G06K 19/07363; G06K 19/07372; G06K 19/07381; G06K 19/0739; G06K 1/024; G06K 19/0717;
(Continued)

(56) References Cited

U.S. PATENT DOCUMENTS 7,764,183 B2 * 7/2010 Burchell ................ G01K 1/024
340/585
9,485,266 B2 * 11/2016 Baxley .................. H04W 12/06
(Continued)

*Primary Examiner* — Ojiako K Nwugo
(74) *Attorney, Agent, or Firm* — One LLP; Joseph K. Liu

(57) ABSTRACT

A condition monitoring system includes a radio frequency transponder module including an RFID chip having a first memory, and an antenna; at least one sensor module that monitors data related to the condition of an item and includes a second memory for storing the monitored data; and a communication interface that couples the at least one sensor module to the RFID chip of the radio frequency transponder module so that the sensor module is operative to communicate with the RFID chip by way of the communication interface and the RFID chip first memory is operative to store data related to the item.

22 Claims, 19 Drawing Sheets

Related U.S. Application Data continuation of application No. 13/771,005, filed on Feb. 19, 2013, now Pat. No. 9,946,904, which is a continuation of application No. 13/535,304, filed on Jun. 27, 2012, now abandoned, which is a continuation of application No. 12/982,842, filed on Dec. 30, 2010, now abandoned, which is a continuation of application No. 12/832,855, filed on Jul. 8, 2010, now Pat. No. 7,982,622, which is a continuation of application No. 11/655,860, filed on Jan. 19, 2007, now Pat. No. 7,764,183, which is a continuation-in-part of application No. 11/112,718, filed on Apr. 22, 2005, now Pat. No. 7,495,558.

(60) Provisional application No. 60/566,019, filed on Apr. 27, 2004.

(51) Int. Cl.
*G01K 1/024* (2021.01)
*G01K 3/04* (2006.01)
*G04F 10/00* (2006.01)
*G06K 19/07* (2006.01)
*G06Q 30/06* (2012.01)
*F25D 29/00* (2006.01)

(58) Field of Classification Search
CPC .......... G01K 1/024; G01K 3/04; G06Q 30/06; F25D 29/00; F25D 2700/08; G04F 10/00
See application file for complete search history.

(56) References Cited

U.S. PATENT DOCUMENTS

| | | | | |
|---|---|---|---|---|
| 9,946,904 | B2* | 4/2018 | Burchell | G01K 3/04 |
| 2005/0171738 | A1* | 8/2005 | Kadaba | G07C 5/085 |
| | | | | 702/187 |
| 2007/0191025 | A1* | 8/2007 | McBrierty | H04W 64/00 |
| | | | | 455/456.2 |
| 2007/0260554 | A1* | 11/2007 | Marui | H04L 9/0894 |
| | | | | 705/71 |
| 2008/0074254 | A1* | 3/2008 | Townsend | G01W 1/17 |
| | | | | 340/539.11 |
| 2008/0240160 | A1* | 10/2008 | Ishii | H04W 40/246 |
| | | | | 370/475 |
| 2013/0201316 | A1* | 8/2013 | Binder | H04L 67/12 |
| | | | | 348/77 |
| 2016/0124407 | A1* | 5/2016 | Kallio | G05B 19/042 |
| | | | | 700/86 |

* cited by examiner

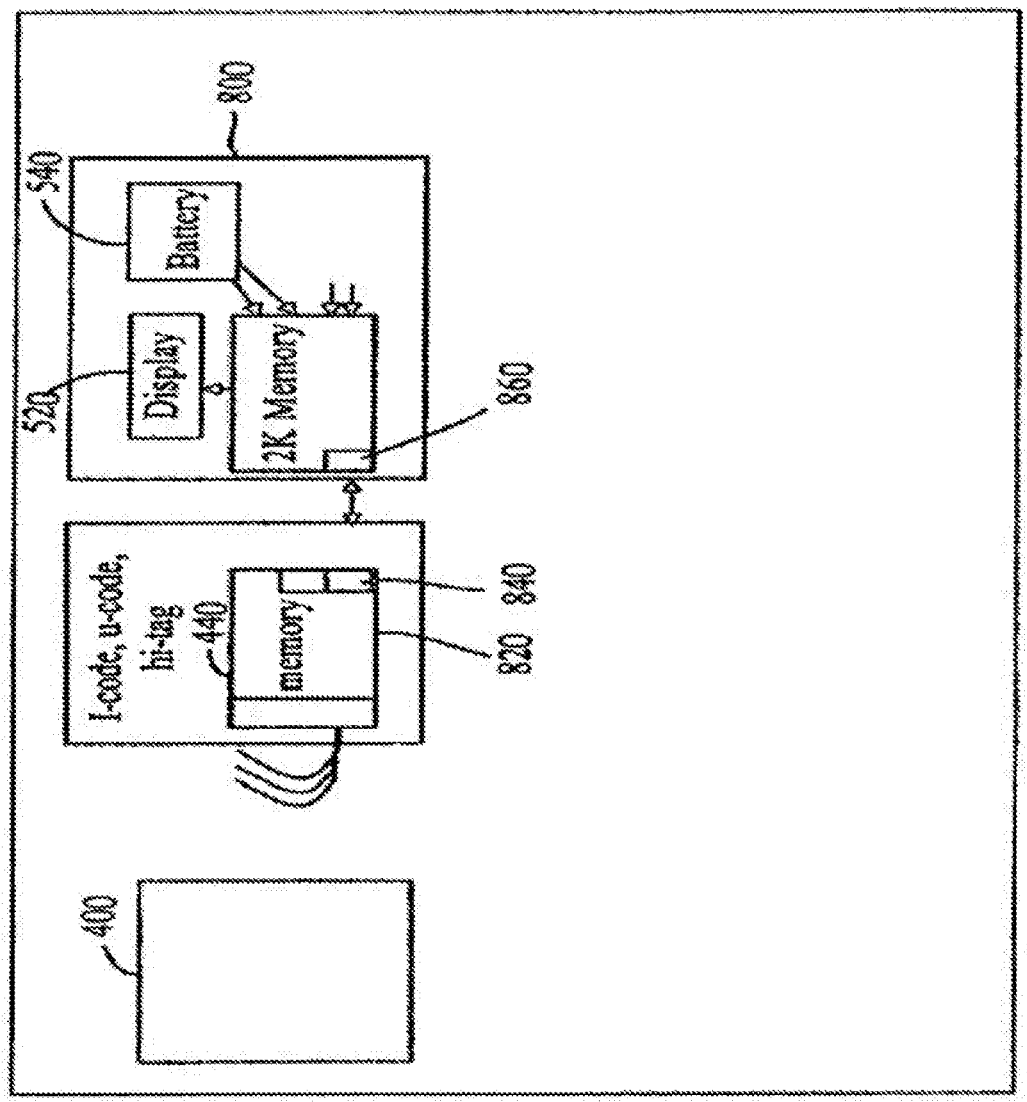

APPARATUS AND METHOD FOR MONITORING AND COMMUNICATING DATA ASSOCIATED WITH A PRODUCT/ITEM

CROSS-REFERENCE TO RELATED APPLICATIONS

This application is a continuation application of U.S. patent application Ser. No. 15/914,212, filed Mar. 7, 2018, which is a continuation of U.S. patent application Ser. No. 13/771,005, filed Feb. 19, 2013, now U.S. Pat. No. 9,946,904, which is a continuation application of U.S. patent application Ser. No. 13/535,304, filed Jun. 27, 2012, now abandoned, which is a continuation application of U.S. patent application Ser. No. 12/982,842, filed Dec. 30, 2010, now abandoned, which is a continuation application of U.S. patent application Ser. No. 12/832,855, filed Jul. 8, 2010, now U.S. Pat. No. 7,982,622, which is a continuation application of U.S. patent application Ser. No. 11/655,860, filed Jan. 19, 2007, now U.S. Pat. No. 7,764,183, which is a continuation-in-part application of U.S. patent application Ser. No. 11/112,718, filed Apr. 22, 2005, now U.S. Pat. No. 7,495,558, which claims priority pursuant to 35 U.S.C. § 119(e) to U.S. Provisional Application Ser. No. 60/566,019, filed Apr. 27, 2004, the disclosures of all of which are incorporated herein by reference herein in their entireties.

FIELD OF THE INVENTION

The invention relates to an apparatus and a method for monitoring and communicating data associated with an item. More particularly, the invention relates to RF smart labels and related sensors, software, and processes that may be used for monitoring, analyzing, and communicating item data, such as "freshness", perishability, and/or time/temperature data.

BACKGROUND

Perishable items, such as chilled and minimally processed food items, vaccines, pharmaceuticals, blood, film, chemicals, adhesives, paint, munitions, batteries, soft drinks, beer, cosmetics, and many other items, each have a unique shelf life. Item quality is affected by a number of factors that may be physical, chemical or biological in nature, and that act together in often complex and interconnected ways. Temperature is usually a significant factor determining the longevity of quality. Sensors have been proposed to monitor and report the shelf life or integrity of an item (e.g. how well the quality of the item has been maintained over time). U.S. patent application Ser. No. 11/112,718 (the '718 application), which is assigned to the present assignee and which is incorporated herein by reference, describes a class of sensors that utilize RF technology for communicating precise, temperature-dependent, shelf life, and other time-dependent sensor monitoring of perishable items. The sensors may operate in conjunction with RF transponders (also known as RFID or radio frequency identification devices), such as those used for tracking and tracing items. For example, the sensors may be directly or indirectly coupled to and/or integrated with an RF transponder.

SUMMARY OF THE INVENTION

Embodiments of the present invention combine digital sensing and RFID technology for input and output of sensing data. This makes possible a new class of sensors, including sensors that monitor and report the integrity of an item (e.g., how well the quality of the item has been maintained). Embodiments of the present invention add an alternate visual and/or audio communication interface to RF digital sensors for the purpose of communicating shelf life and sensor data. This alternate visual/audio communication interface may be used to set-up and configure the sensor when an RF reader is not present, to locate an item or container in various situations, including those where the RF reader may not be working properly, offload sensor data in situations where RF readers are not present, and in situations where the amount of sensor data is communicated faster in a non-RF manner. For example, embodiments may use user-activated push buttons, RF commands, sensor software automatic activation, or visual/audio remote control to activate and deactivate visual and/or audio communication.

In one embodiment of the invention, the sensor may use LEDs to signal shelf life status, respond to a "where are you" location request or set up a visual signaling scheme to receive or transmit sensor data.

In another embodiment of the invention, a visual display, such as an LED, LCD, or OLED, provides a specific number of different signaling schemes, based upon pulse length and pattern that generate a time domain pulse sequence, Morse code, or other coding algorithm. The signaling schemes may be used to signal shelf life status or item information, respond to a "where are you" location request or send and receive shelf life setup or history data. Alternatively, a sensor may use different types of audio sounds signal to shelf life status, item information and alerts, and/or respond to a "where are you" location request.

In another embodiment, a sensor may use visual displays and audible signals to transmit information to a user indicative of two or more types of item data, such as data identifying a type of item and data relating to the freshness, perishability and/or shelf life of the item. Visual and audible indicators may signal early warning alerts or specific information (for example, by use of color or dot-dash type coding). When an RF sensor/indicator is enhanced with visual/audio signaling systems, the sensor data can be communicated to a user or a remote visual/audio receiver when RF readers are not available, when RF performance is low, when data to be communicated by the sensor is extensive, and when a particular tagged item needs to be located.

In another embodiment, an elongated smart label or "long tag" includes an extended interface between the antenna/RFID device and the sensor module, including a pair of inductors. The long tag provides a solution that allows a user to position the sensor module inside a package while positioning the antenna and/or RFID device outside of the package for RF reception. For best RFID performance and because standard RFID tags often include shipping or item identification data and/or barcodes, RFID labels may be adhesively attached to the outside of the tagged case. Placing the sensor module inside a package, such as a cold box, while allowing the antenna to reside outside of the package provides various advantages. For example, and without limitation, the long tag allows for optimal sensing and RF reception when used together with temperature sensitive goods that are placed in a container lined with metal and/or containing ice or dry ice packs, which could reduce RFID read performance. In one embodiment, the power supply or battery is placed near the antenna, remote from the sensor module. This allows the battery to reside outside of a container, thereby eliminating risk that cold or freezing temperatures cause battery voltage to drop. Additionally, a long tag could be used to sense the temperature of cases located in the middle of a pallet.

According to one aspect of the invention, a sensor is provided for monitoring and communicating data related to a perishable item. The sensor is adapted to operate with an RFID device including an antenna for receiving signals from an RF reader. The sensor includes a sensor module that monitors time and temperature of a perishable item, that determines a current freshness status based on the time and temperature, and that selectively transmits data representing the freshness status. The sensor further includes a communication interface with the RFID device. The interface allows an RFID reader to retrieve data representing the freshness status from the sensor module and allows the sensor module to detect activation of the RFID device. An indicator is communicatively coupled to the sensor module. The indicator is adapted to selectively activate and communicate the freshness status by use of a humanly perceivable signal under control of the sensor module. The sensor module is adapted to selectively activate the indicator in response to detecting activation of the RFID device.

According to another aspect of the invention, a method is provided for locating a perishable item by use of an identification signal generated from an RFID reader. The method includes providing a smart label that is attachable to a container including the perishable item. The smart label includes an RFID device and a sensor module that is communicatively coupled to the RFID device. The sensor module includes an indicator for generating a humanly perceivable signal. The method further includes receiving an identification signal from an RFID reader, detecting receipt of an identification signal by the RFID device by use of the sensor module; and causing the indicator to generate a humanly perceivable signal in response to the detected receipt of the identification signal.

Other features are described and claimed below and/or are apparent from the drawings.

BRIEF DESCRIPTION OF THE DRAWINGS

FIG. 15 is a further block diagram that illustrates separate RFID and sensor components that are at least signal coupled together.

DETAILED DESCRIPTION OF THE PREFERRED EMBODIMENTS

Embodiment of the present invention will now be described in detail with reference to the drawings, which are provided as illustrative examples of the invention so as to enable those skilled in the art to practice the invention. Notably, the implementation of certain elements of the present invention may be accomplished using software, hardware, firmware, or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Embodiments of the invention are described below relating to RF smart labels, tags, sensors, software, and processes particularly for monitoring and analyzing the shelf life of a perishable item ("product" and "item" are used interchangeably throughout this application). For example, the labels, tags, and sensors may be used to indicate the freshness, perishability or shelf life of-an item, and/or to provide logistics and inventory management to RFID tracking and tracing of items. The '718 application, which has been incorporated by reference, describes labels, tags, and sensors that can be used to implement the present invention.

Figure 1A:
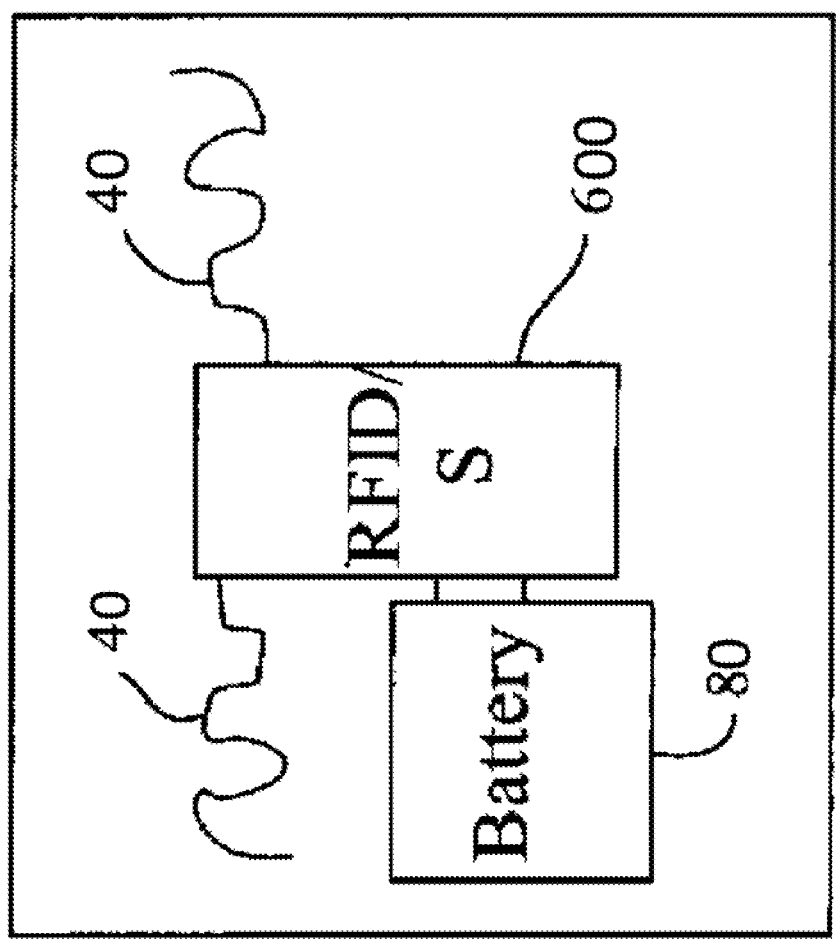
FIG. 1A schematically illustrates an active RF/sensor including a battery according to one embodiment of the invention.

FIG. 1A schematically illustrates an active RF/sensor including a battery in accordance with one embodiment. A chip 600 having RFID and sensor components is energized by a battery 80 that is resident on the sensor. In each of the embodiments described with reference to FIGS. 1A-16B, the sensor is provided preferably in a substantially planer label attached to affected or perishable items that monitor the item integrity, usability and safety of an item or an environment in conjunction with an RF transponder, such as RFID ultrahigh frequency (UHF), high frequency (HF), low frequency (LF), Zigbee, Bluetooth, or other radio frequency identification transponders. In the case of perishable items, the sensors may include temperature, shelf life (the integration of time and temperature), humidity, vibration, shock, and other sensors that determine how well the quality of a perishable has been maintained. In the case of nonperishable items, sensors may include the abovementioned sensors plus item specific sensors that monitor the wear and tear on a particular item.

Figure 1B:
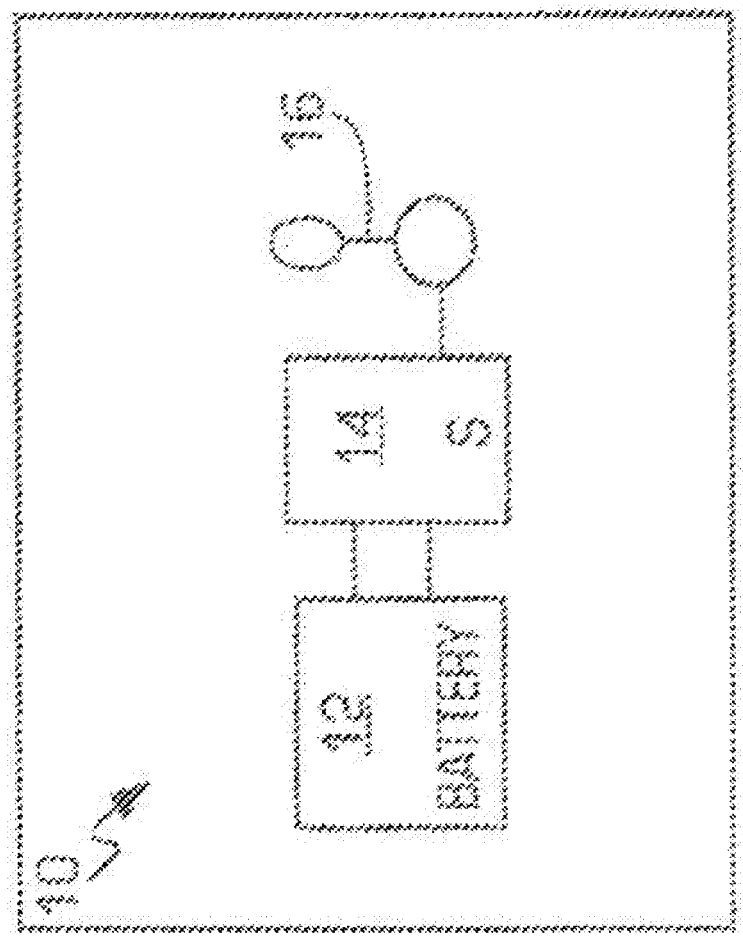
FIG. 1B schematically illustrates a sensor adapted to communicate data associated with an item according to another embodiment of the invention.

FIG. 1B illustrates one embodiment of a shelf life sensor 10, according present invention. The sensor 10 includes a power supply or battery 12, a sensor module 14, and an indicator/switch 16. The sensor module 14 is coupled to and receives electrical power from battery 12, which may comprise a coin cell, flexible battery or other relatively thin power supply. The sensor module 14 may include sensor logic, such as a conventional processor chip and/or circuitry, a memory module for storing data, such as data related to a perishable item, freshness data, or data representing one or more predefined temperature-dependent shelf life trends, and a sensor component adapted so sense and/or detect temperature and/or other item parameters. The sensor logic or processing circuitry can compare data received from the sensor to trend data in memory to determine the freshness, perishability, or shelf life of a particular item. This may be performed in the manners described in the '718 application and/or U.S. Pat. No. 5,442,669 (the "'669 patent"), which is assigned to the present assignee and which is incorporated herein by reference. In alternate embodiments, the sensor module 14 may use external memory, such as the memory contained in an RFID device, to store item data, and sensor measurements.

The sensor module 14 preferably includes a conventional interface for communicatively coupling the module 14 to an RF transponder, as discussed in greater detail below in reference to FIGS. 2-4. Particularly, the sensor module 14 may be used in conjunction with an RF transponder or other radio frequency identification (RFID) system used to communicate data, locate, track, and trace items or monitor an environment. The sensor module 14 may also be used in conjunction with an RF communication interface such as Bluetooth or Zigbee. The sensor module 14 is further coupled to the indicator/switch 16 and can selectively signal indicator/switch 16 in order to activate/deactivate (turn on and off) the indicator. In one embodiment, the structure of sensor module 14 may include structures substantially similar to the sensor chips described in the '718 application.

The indicator/switch 16 may be communicatively coupled to the sensor module 14 and may receive electrical power from battery 12. The indicator/switch 16 may include a LED, OLED, LCD, light, or other visual, audio, or otherwise humanly perceivable sensory indicator for providing information regarding a monitored item and/or the freshness of the item that is being monitored. For example, the indicator/switch 16 may comprise a multi-colored display (e.g., LED or LCD) adapted to generate a different color based on a particular signal. In one embodiment, the indicator/switch 16 may also include a conventional electrical or capacitive switch for selectively activating the display and/or the sensor module 14, for example, by manually depressing the indicator/switch 16. The switch and display elements may be separate devices that are communicatively coupled together. Alternatively, the switch and display elements may comprise a single integrated component. For example, the indicator/switch 16 may be constructed in a "stacked" configuration, including a transparent cover or membrane, a visual indicator (e.g., an LED) located below the membrane, and electrical switching circuitry below the indicator. When the membrane is depressed, the switching circuitry closes, which "wakes up" or activates the sensor module 14 and/or display. For example, the sensor may be shaped like a dot, approximately 3-6 millimeters in diameter, folded, with two or more layers of stacked electronics, one of which is a switch, and one of which is a display (or audio), so that when touched it flashes back in one or more colors, or in a dot-dash code or by RF, or other form of communication to an acceptable reader, human, machine or otherwise. In an alternate embodiment, display 16 may be replaced by and/or comprise an audible indicator, for example, a low power audible oscillator that generates humanly perceivable sound.

Figure 10A:
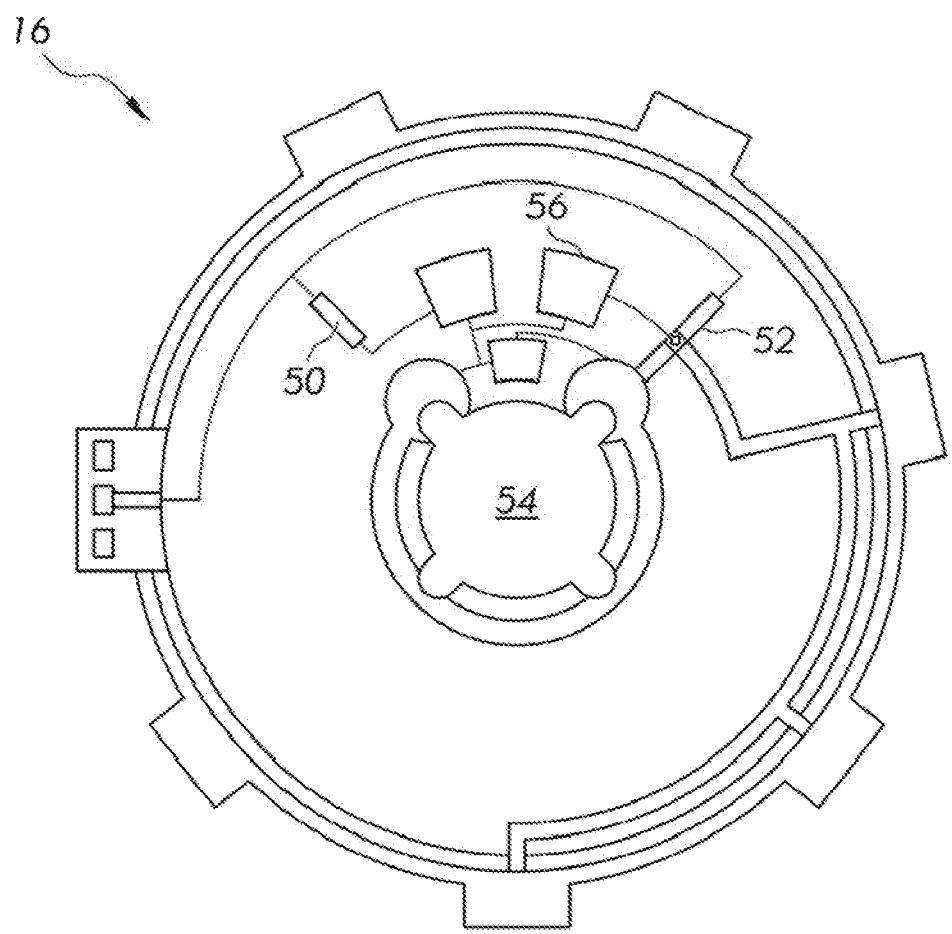
FIGS. 10A and 10B respectively illustrate a plan view and an elevation view of an embodiment of a display/switch that may be used with the RFID sensors of the present invention.
Figure 10B:
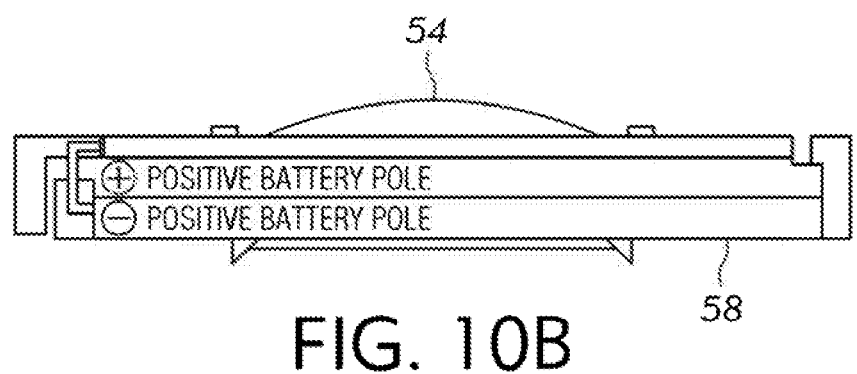
Figure 11A:
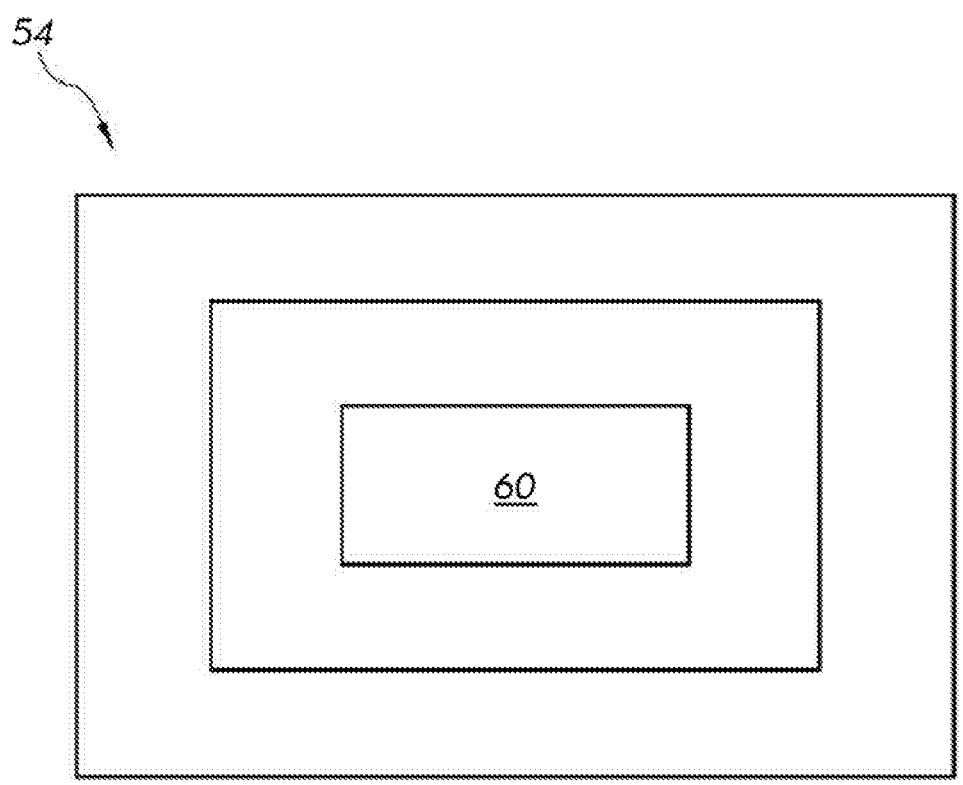
FIGS. 11A-11D show an embodiment of a push-button switch that may be used with the display/switch shown in FIGS. 10A, 10B and the RFID sensors of the present invention.
Figure 11C:
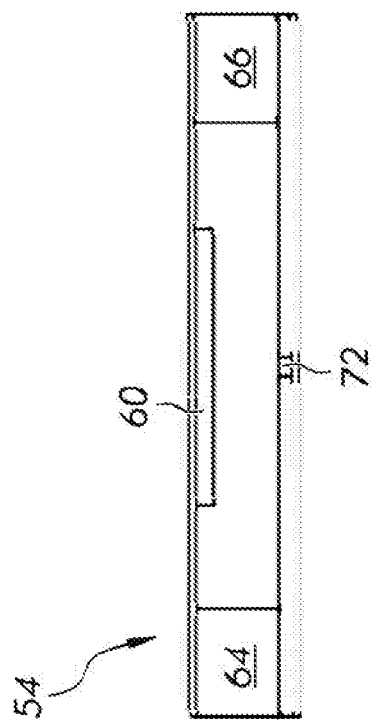
Figure 11D:
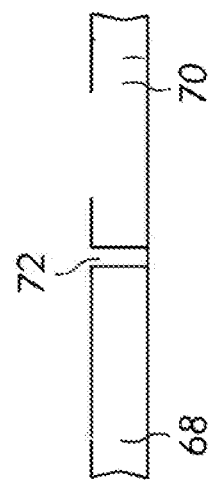
Figure 11B:
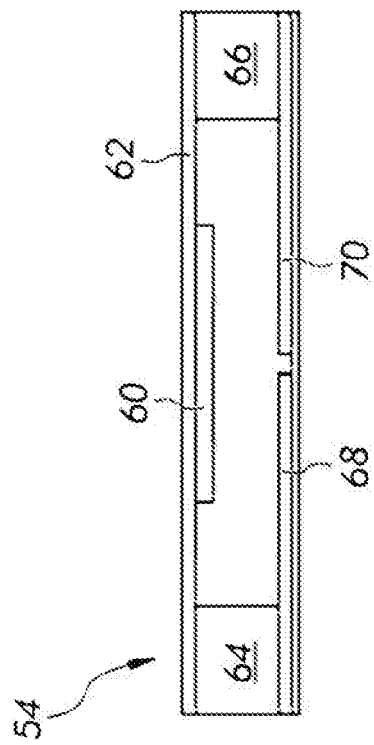

FIGS. 10A and 10B illustrate one embodiment of a display/switch 16. Display/switch 16 includes a pair of LEDs 50, 52, which may comprise red and green LEDs, respectively, and a push-button switch 54. Integrated circuitry 56 controls the operation and/or activation of LEDs 50, 52. The LEDs 50, 52, switch 54, and integrated circuitry 56 is electrically coupled to the positive and negative poles of a thin battery cell 58. The LEDs 50, 52, switch 54, and integrated circuitry 54 may be preferably adhered to the battery cell using a conventional adhesive.

FIGS. 11A-11D show one embodiment of a push-button switch 54 that may be used with the display/switch 16. The button can be dispensed using a standard machine tape. The button includes a conductive member 60 that is attached to the top substrate or tape portion 62. A pair of adhesive spacers 64, 66 adhere to the substrate 62 and hold the conductive member away from the conductive leads 68, 70 below. The conductive leads 68, 70 are separated by a small switch gap 72. When the button is depressed, the conductive member 60 is placed in contact with conductive leads 68, 70. This forms and electrical connection between the leads and closes the circuit.

The sensor 10 is preferably embodied in a substantially planar label that may be attached to affected or perishable items in order to monitor the item integrity, usability and safety of an item or an environment. In the case of perishable item, the sensor modules 14 may include conventional temperature, shelf life (the integration of time and temperature), humidity, vibration, shock and other sensors that determine how well the quality of a perishable has been maintained, such as the sensors described in the '718 application and/or the '669 patent. In the case of non-perishable items, sensors may include the above-mentioned sensors plus item specific sensors that monitor the wear and tear on a particular item.

In one embodiment, sensor 10 comprises a smart label that is adapted to be attached to an item or container and that monitors temperature and time. For example, the sensor may sense and integrate temperature over time while referencing a data table containing the shelf life parameters for a tagged item, as may be previously provided or understood by a perishable producer. These shelf life parameters and determinations may include calculations based upon Arrhenius equations with additional refinements, depending upon the quality concerns of the perishable producer. The result is a customized, item—specific, real-time indicator of shelf life left and/or shelf life history.

In one embodiment, the sensor 10 generates a visible and/or audible signal that has a frequency, duration and/or periodic characteristic that varies based on one or more factors. For example, the sensor 10 may generate one or more periodic signals representative of at least two factors, such as type of item and its freshness. A first factor may include, for example, a type or classification of a used to identify it by type or general class of &-items or goods. A second factor may include a freshness of that particular item or good. Preferably, the freshness is determined by the sensor module 14 in the manner described in the '718 application. The sensor module 14 can communicate signals to the indicator/switch 16 in order to visually and/or audibly indicate the freshness of the item.

As an example of a visual indicator, a green dot generated by the display 16 (e.g., an LED) may indicate a fresh item, while a red dot may indicate a spoiled item. The same dot may flash with a period of one second, so that it is illuminated for a half second and off for a half second periodically, to indicate a particular produce type. A different produce type may have a period of two seconds, and a medicine type may have a period of three seconds.

This signaling scheme may also be reversed, so that the dot illuminates for a duration corresponding to the freshness of the item, e.g., longer duration for fresher item. For example, a green dot may indicate produce type A, a red dot may indicate produce type B, and a yellow dot may indicate a medicine item. The display may generate a periodic flashing green light to indicate a "freshness" percentage or shelf life of the item. For example, the longer the period that the green light flashes, the shorter the shelf life of the item. Alternatively, the sensor may use a code may to communicate the percentage of the shelf life remaining or the number of days remaining. For example, three-second periods may comprise months, two-second periods may comprise weeks, and one-second periods may comprise days. In this example, a three-second flash, followed by three one-second flashes, would represent a month and three days of shelf life. In an alternate embodiment, the display includes both dashes and dots for communicating information relating to item type and shelf life using a code, for example, Morse code.

As an example, regarding audible signals, a high pitch sound may indicate a fresh item, while a lower pitch sound may indicate a spoiled item. The same dot may sound-off for a predetermined time period (e.g., one second), so that it generates sound for a first predetermined time (e.g., a half second) and is silent for a second predetermined time (e.g., a half second), to indicate a particular produce type. A different produce type may have a different period (e.g., two seconds), and a medicine type may have another period (e.g., three seconds). These may be reversed, so that the sound is heard for a duration corresponding to the freshness of the item, e.g., longer duration for fresher item. Alternatively, different sound types could be used, such as a B flat tone to indicate produce type A, a C sharp tone for produce type B, and a D flat tone for a medicine item.

Figure 2:
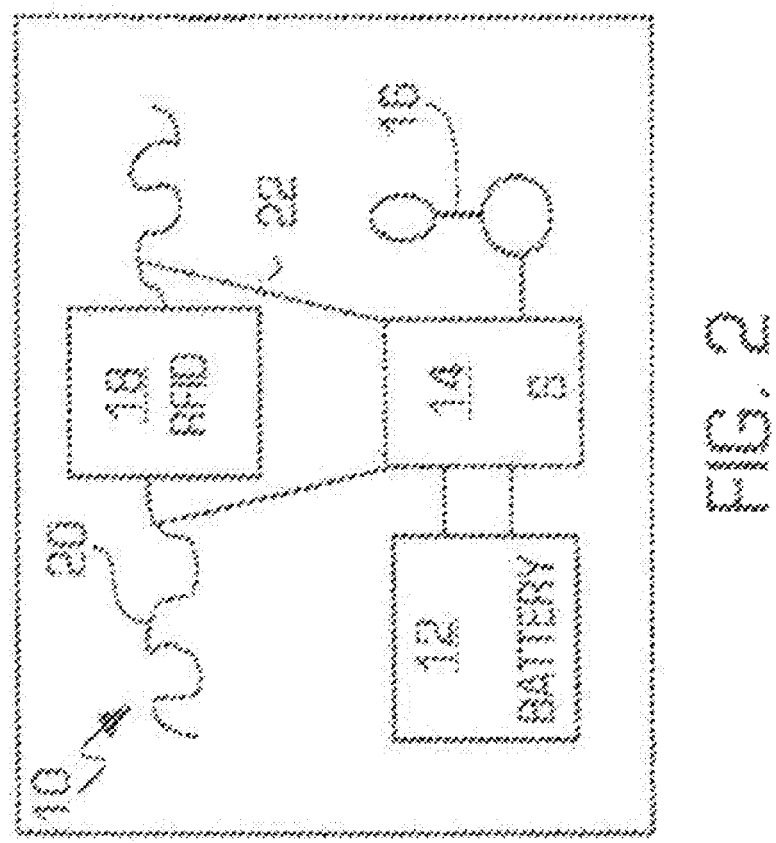
FIG. 2 schematically illustrates an RF sensor having a direct sensor-to-antenna connection according to another embodiment of the invention.
Figure 3:
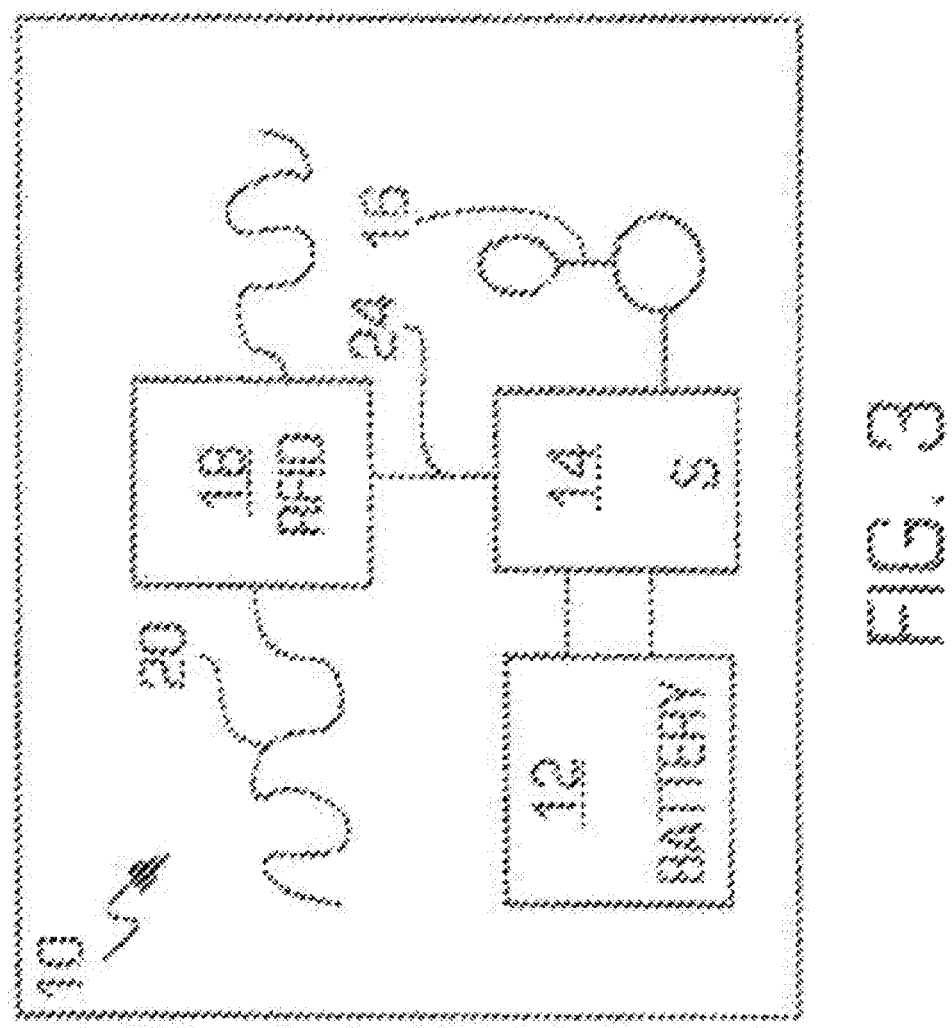
FIG. 3 schematically illustrates a semi-passive RF sensor having a serial interface between sensor and RFID components according to another embodiment of the invention.
Figure 4:
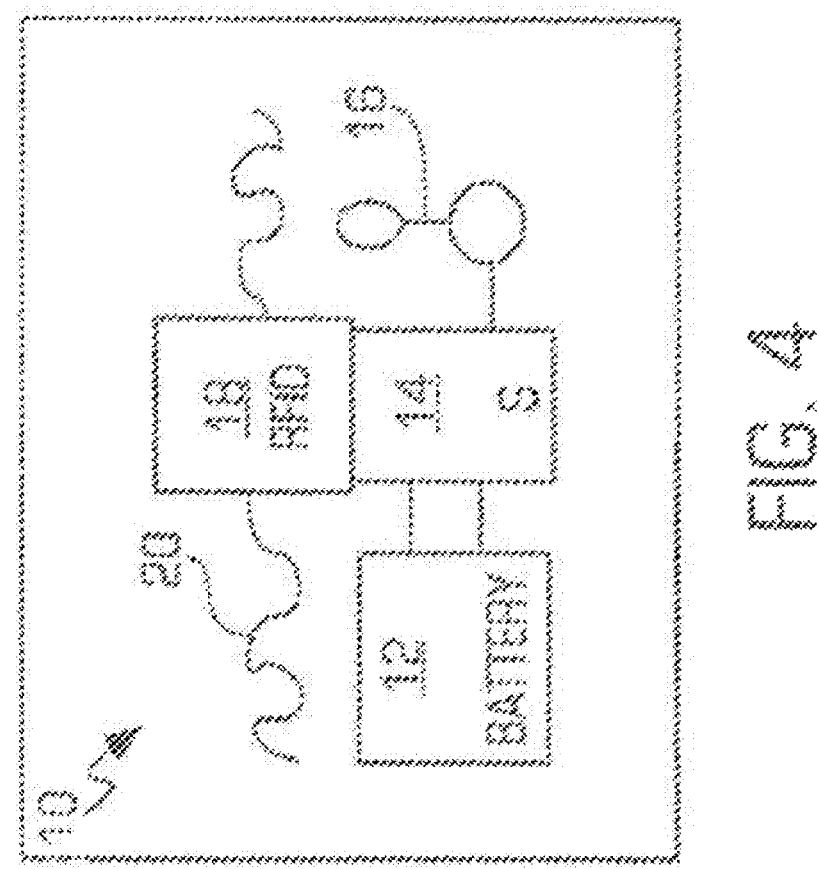
FIG. 4 schematically illustrates an active integrated sensor and RFID module according to another embodiment of the invention.

Referring now to FIGS. 2-4, the sensor 10 may be communicatively coupled to an RFID device or RF transponder 18, which may comprise a conventional RFID integrated circuit. In one embodiment, the sensor 10 and RFID 18 may be integrated within a single device. In the embodiment shown in FIG. 2, the sensor module 14 has the ability to connect to transponder 18 via a direct current connection 22 to the transponder's antenna 20. In the embodiments shown in FIGS. 3 and 4, the sensor module 14 connects to the transponder 18 via a one-wire or a two-wire interface 24, respectively. The transponder 18 assigns a predetermined amount (e.g., 32 bits) of user read/write memory exclusively to the sensor. The sensor may use this designated RF transponder memory to report sensor status and alerts, to generate a particular indication signal by use of indicator/switch 16, and to send/receive sensor commands to/from an RF reader.

In the case of a multi-chip RF tag, the tag's circuit architecture supports an RFID transponder chip with support for either a direct current connection to the RF antenna (FIG. 4) or for a one- or two-wire serial interface to a sensor integrated circuit (FIGS. 2-3), and a predetermine amount of read/write user memory. One or more sensor integrated circuits provide sensing, sensing power management, sensing data memory management and RF detection/interface to the RFID transponder. The system preferably includes a battery 12 for powering the sensor(s) and optionally enhancing the communication signal when sensor data is sent to an RF reader (although the system may also be passively configured). The battery also can be used to support the initiation of RF communication by the sensor.

The system includes a communication interface preferably having the following features. First, it is configured to provide notification to the sensor 10 that data or commands are being sent by an RF reader or other RF device including another sensor. The notification may be provided from the RF transponder 18 or from circuitry in the sensor 10 that is watching the RF data for sensor commands. The commands may include a command from an RFID reader that corresponds to a particular RFID device. Alternatively, a sensor identifier command could be used that identifies a specific sensor using an identification code or serial number. The sensor identification may also be associated with a container or item. The interface may also be configured with the ability for the sensor, as part of its sensing operation, to store sensor status, and alert data into designated RF transponder memory. The interface preferably may also have the ability for the sensor and the RF reader or other RF device to send/receive commands and data using designated RF transponder memory. In one embodiment, the interface has the ability for the sensor to bypass the RF transponder memory and to establish a direct path from the RF reader to the sensor for the purpose of initial sensor configuration and for downloading sensor history.

Memory

The current RF transponder chip is preferably configured to address large amounts of memory (8K bytes). For RF system performance reasons, the RF chip may actually be populated with as little as 8 to 256 bytes of physical memory. The RF reader's commands to the sensor chip may be the RF transponder's unpopulated memory addresses, or pseudo memory. This command syntax enables no modification to the RF reader for sensor support. Alternatively, the RF reader commands to the sensor can be special commands involving RF reader software that is modified to interpret the commands.

The RF transponder may be configured to ignore illegal commands. It may or may not issue an error message when it sees illegal commands. This enables the sensor commands sent by the reader to be placed in the designated memory area for the sensor.

It is preferred that the RFID sensor-transponder used as a label for tracking and tracing goods be inexpensive. As a result, the transponder sensor may be powered by a remote RF reader or inexpensive battery and contain as little memory as possible, e.g., 64-2048 bits, even though the RFID chip may be capable of addressing up to 8 k bits of memory.

A shelf life monitoring design may include a two-chip system (FIGS. 2-4), or alternatively may include a single chip that exhibits two-functions within the chip. A shelf-life chip or module may be used to treat an RFID memory as an input/output pipe to an RF reader. Memory used for RFID applications is treated separately from shelf-life memory. Shelf-life memory may be accessed through one or more 32-bit blocks of the RF memory. In a two-chip implementation, a shelf life chip may communicate to an RFID chip via serial interface over a 1-wire bus.

In order to make a shelf-life memory more accessible and usable by an RF reader, shelf life memory addresses may be named based upon unused addresses in the RFID memory (i.e., memory addresses over 2048 bits to 8000 bits). When an RF reader sends an address over and above physical memory in the chip, the RFID chip routes the address to the shelf life memory. Data in this memory address on the shelf life chip is sent over the 1-wire bus to the 32-bit memory block on the RFID chip and then transmitted via radio frequency to the RF reader.

Although primarily shelf life monitoring is described herein, the shelf life chip may be designed to support multiple sensors, such as humidity or vibration. This sensor data is assigned these pseudo RF addresses, access to which is through the shelf life chip to the RF memory and out to the reader.

Power Management

The sensor 14 preferably performs its sensing operations at intervals specified by the user. As illustrated at FIGS. 1-4, the sensor is battery operated. To conserve battery power, the sensor 14 sleeps between sensing intervals. At the predetermined sensor interval, the sensor wakes up, acquires the sensor data and analyzes the sensor data to determine exception conditions. For example, it preferably calculates the percentage of item life used for the time interval. The sensor 14 may determine that a threshold has been exceeded. The sensor then copies the results of its exception calculations/alerts to the RF transponder's memory and returns to sleep. This data is sent by the RF transponder to the RF reader or other RF device in accordance with its normal RF operations.

If the RF reader or other RF device requests more sensor information, it does so by sending commands to the RF transponder for the sensor. Advantageously, how the sensor is notified that the RF reader has or wants sensor data is dependent upon the physical interface between sensor and RF transponder. If the physical interface is via direct current from the antenna, the sensor watches for RF signals to the RF transponder, determines when a communication link between the attached RF transponder and RF reader has been established, determines when data has been written to the designated RF transponder memory and optionally determines if a special sensor command has been sent by the RF reader. If the physical interface is a one- or two-wire serial interface, the RF transponder notifies the sensor that the RF reader has or wants data.

When the sensor 14 has been notified of a request for data, it wakes up, and reads/writes the data requested into the RF transponder's memory. It then goes back to sleep.

There are situations when the amount of data sent or received is large, for example, when the RF reader loads sensor configuration data and history collection rules into the sensor 14 and when the sensor 14 has log and history data to be downloaded. In these situations, the sensor interface allows sensor to by-pass the RF transponder's memory for sending or receiving blocks of data. The result is the establishment of a direct connection between the sensor 14 and the RF reader.

The system is preferably configured to sense, then summarize data in the sensor memory (shelf life % left, hi/lo temperature thresholds exceeded, time elapse exceeded), then look for exceptions by comparing the summary to conditions preconfigured by the user and finally to alert user that all is ok or not. This summary info and alerts uses very little memory, and immediately after the sensing, it is put into the RF memory as "quick alerts". Once quick alerts are in the RFID memory, they are read like any other RF data, even when the sensor is asleep or in an otherwise low power state. The sensor also keeps history for later use in insurance claims, which can be downloaded upon command by user.

The embodiments described herein generally relate to means for enabling a discrete sensor or multiple discrete sensors to be added onto, coupled with or piggyback attached to an RF transponder component for the purpose of communicating sensor data to and from remote RF computer devices and networks. A sensor communication interface is provided to an RF transponder for the purpose of communicating sensor alerts and history to an RF reader. A sensor architecture is provided for the management of sensor data. A method for physically mounting the sensor(s) onto an RF or RFID tag is also provided. Straightforward transition is enabled from discrete components to a combined sensor-RF integrated circuit, permitting sensor RF tags to be tested using discrete components until volume demands an integrated solution.

Further Transponder—Sensor Configurations

Figure 16A:
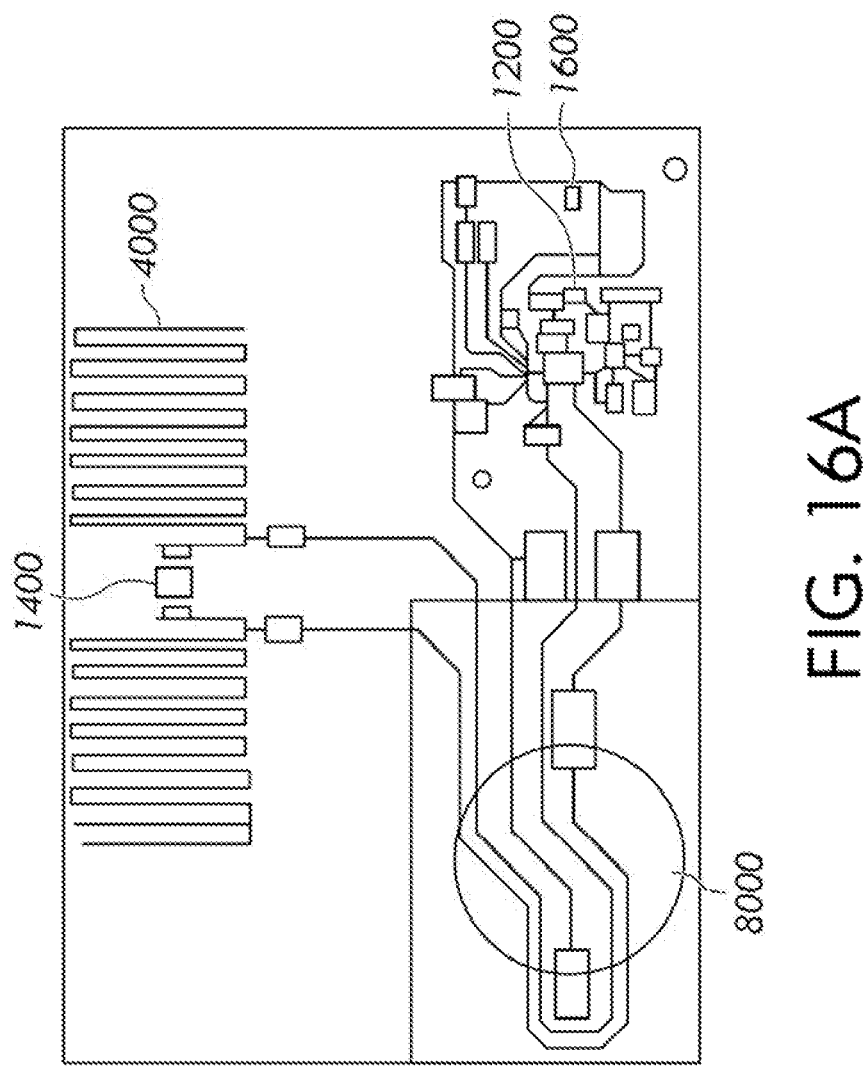
FIGS. 16A and 16B schematically illustrate components of RFID sensors in accordance with further embodiments.
Figure 16B:
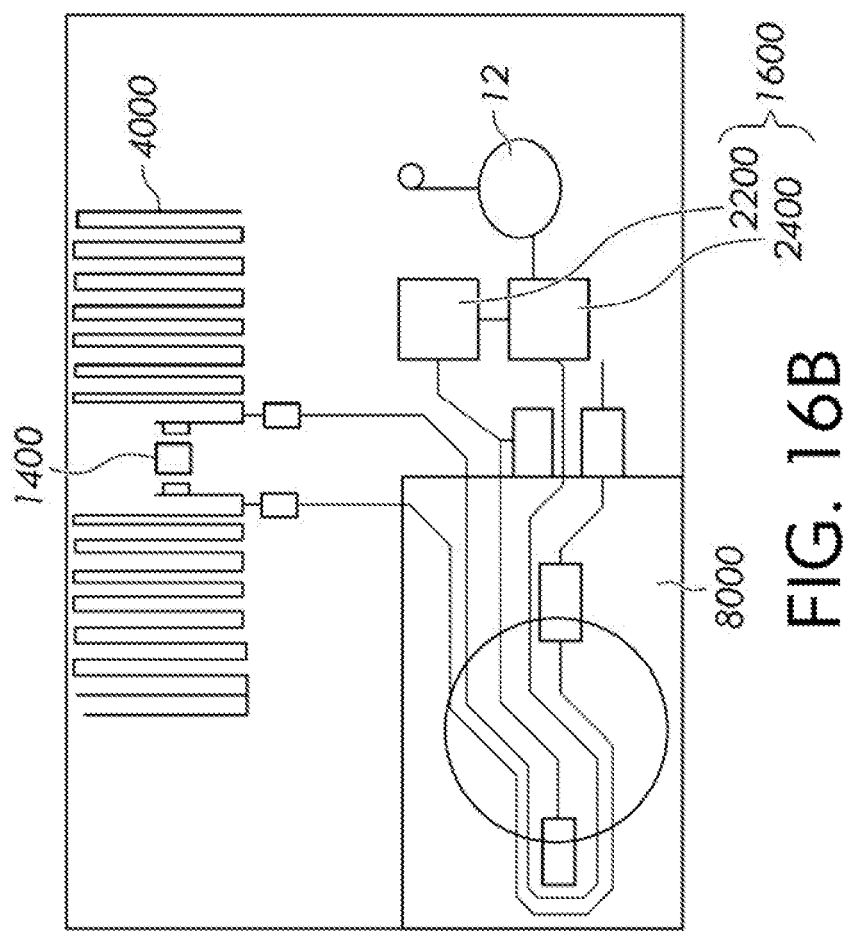

FIGS. 16A-16B schematically illustrate a freshness tag in accordance with a preferred embodiment. The tag includes an RFID chip 1400 coupled with an antenna 4000 for communicating with an RFID reader. A battery 8000 is included for energizing the tag permitting the tag to operate at times when a reader is not communicating with it. The battery 8000 permits freshness monitoring and updating at selected times so that freshness status can be updated within the memory and at the display independent of reader interaction. The sensor chip 1600 includes a sensor component 2200 and logic 2400. The sensor 1600 periodically measures time and temperature and determines freshness based on past history and calculation based on spoilage rate tables or formulas. The freshness status is updated and stored in a memory location that is accessible by an RFID reader communicating with the RFID chip 1400 independent of the sensor 1600.

The described embodiments are advantageously configured in order for the RF transponder-sensor systems to be widely used and desired, as case and pallet tags. The transponder unit costs are minimized in one or more of the following ways. First, minimal memory is provided in the transponder component in order to optimize the read distance of transponder. Second, efficient power management is provided by battery control logic including the periodic monitoring capability of the sensor between sleep periods and the accessibility of the freshness data directly by RFID reader. Third, the system is general purpose in order to maximize RF unit volume and thus minimize unit cost. For an example, a memory size of EPC RFID UHF transponders used in the supply chain ranges from 64- or 96 bits for Class 0 and 288-bits for Class 1 Gen2. In alternative embodiments, passive RF transponders may be used, wherein the power for the transponder is provided by a remote RF reader, with the RF reader's objective to keep power required by the RF transponder to a minimum. In the case of active (battery-powered) RF transponders, memory size of the transponder can be larger as the battery can be used to enhance the signal from RF tag to reader.

Sensors, in contrast, are dictated by needs of a particular item or class of item as to what sensors and what sensor data is to be collected, and what spoilage curves are obeyed by particular item. These can be either memory hungry (in order to store sensor data over the life of the item) or require computational capability to summarize and condense the sensing data. Sensors further utilize power management optimized around the sensing interval (not RF). Additionally, for sensors to be used for supply chain and logistics management, sensing data is evaluated and summarized in the tag with exception and alert conditions able to be communicated quickly to RF readers. History is kept in the tag for backup for insurance claims or for use in analysis of what went wrong. Additionally, the sensor may be preferably configured prior to start of sensing with sensing and history logging rules, and other information too bulky to be part of real-time RF inventory logistics.

Programming and Data

Figure 12:
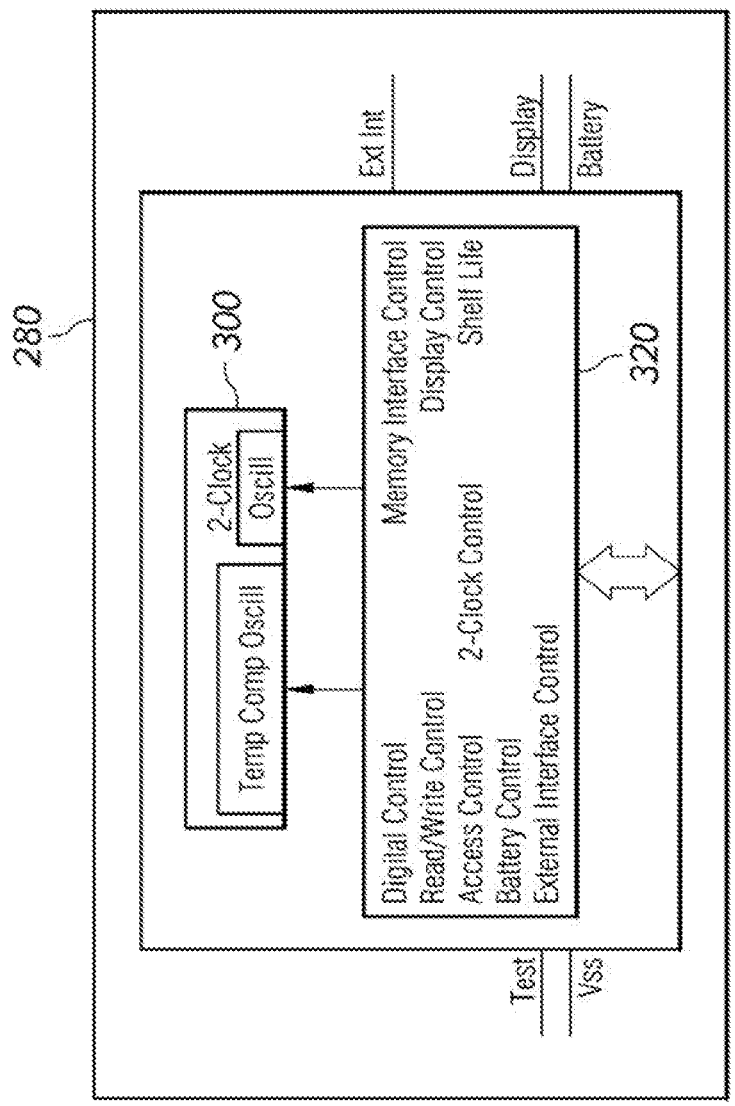
FIG. 12 is a block diagram illustrating programming components of an RF sensor in accordance with a preferred embodiment.

FIGS. 12-15 illustrate chip and memory content configurations in block diagrams of an RFID transponder-sensor system in accordance with preferred embodiments. FIG. 12 illustrates a sensor 280 having a twin oscillator or twin-clock system sensor component 300 that measures temperature and time, preferably in accordance with U.S. Pat. No. 5,442,669, hereby incorporated by reference, and in accordance with a preferred embodiment. The memory block 320 illustrated at FIG. 12 includes several programming components for controlling various functions of the sensor. The digital control, read/write control, and access control programming permit conversion of analog data and access to the data, as well as data updating and downloading. Memory and external internal interface controls permit communication of data via an RFID transponder chip. These also permit the data to be transferred to another tag such as in a mother-daughter tag system that may be used when multiple item bundles are broken up along the supply chain. This feature is advantageous when it is desired to continue monitoring the freshness status of perishable items using past history and present status when items are separated from a pallet or other large supply chain bundles. The programming further includes battery and display controls. The shelf life component includes the tables or calculation formulas for determining current freshness data based on measurement data received periodically from the sensor 300.

Accordingly, an RF-enabled sensor architecture is provided and described herein including one or more discrete sensor(s) and an RF transponder, with these different functions being implemented as modules in an integrated sensor/RF circuit system using the same memory addressing and command structure.

An advantage of the system is its custom-designed I-FRESH integrated circuit. The I-FRESH-IC is designed to be processor-efficient, power-efficient, and memory-efficient, yet accurate, customizable, and auditable. The same I-FRESH-IC can be used to monitor shelf life of an item with a 14-day life or a 3-year life.

The I-FRESH-IC has been designed first and foremost for shelf life monitoring, although it can be used simply as a temperature monitor. The basis of the design is its twin clocks, one of which is a wild clock and the other which is a temperature-compensated clock. These provide a consistency between time and temperature that is the basis of the accuracy of the chip's shelf life (time-temperature integration) calculation over the life of the item. The clocks run at very slow speed, resulting in power efficiency.

The I-FRESH-IC can be either a state machine or microprocessor. Its primary embodiment is the use of tables to calculate shelf life, although alternatively an expression may be used, and calculations may be performed. Preferably, the sensor chip or I-FRESH-IC uses shelf life data provided by the perishable producers for calculating their item's "Use By" or expiration date. This data, expressed in % of shelf life used at each expected temperature, can take into account the effect of the item's packaging. The user can also include high or low temperature thresholds which cannot be exceeded, for example, certain items cannot be frozen or evaporated and conditions under which the user is to be alerted. This data can be input at the fab, distributor, or at the perishable producer. Once loaded into the chip, this data, as well as shelf life calculations and history, can be configured such it either can or cannot be modified, and can be read/write protected if desired.

When started, the chip sensor samples temperature at user-set intervals 24/7 until the end of the item's shelf life. Preferably for food, this sample interval is set at 12 minutes for most items. But other sample rates are possible and configurable depending on life and desired precision.

In addition, the perishable producer, as well as other users of the tag within the supply chain (for example, shipper, distribution center or retailer), can set alert conditions. Examples of alerts: "ship at 90% shelf life left;" "sell at 50% of shelf life left;" and/or "/item is at freezing". Furthermore, history and exception conditions are preferably stored in the chip and can be accessed via an RF reader for printing or saving to a database.

Depending upon battery life, the tag can be reused. Battery options provide for a tag life of up to 10 years, although preferably a service call at twelve reuses or eighteen months is performed to maintain adequate calibration and battery life.

The RFID functionality of the tag may be passive RFID, i.e., communication is initiated and enabled by active RFID reader interrogation of the transponder-sensor system. The tags will support EPC UHF, ISO UHF, ISO HF, ISO LF, and/or other RF communication as applicable for communicating sensor data. The perishable producer preferably specifies the RFID standard (EPC, ISO), frequency (UHF, HF, LF), and memory to be used for RFID use for its unique identification number (EPC) and other uses (256, 512, 2048 bits).

Figure 14:
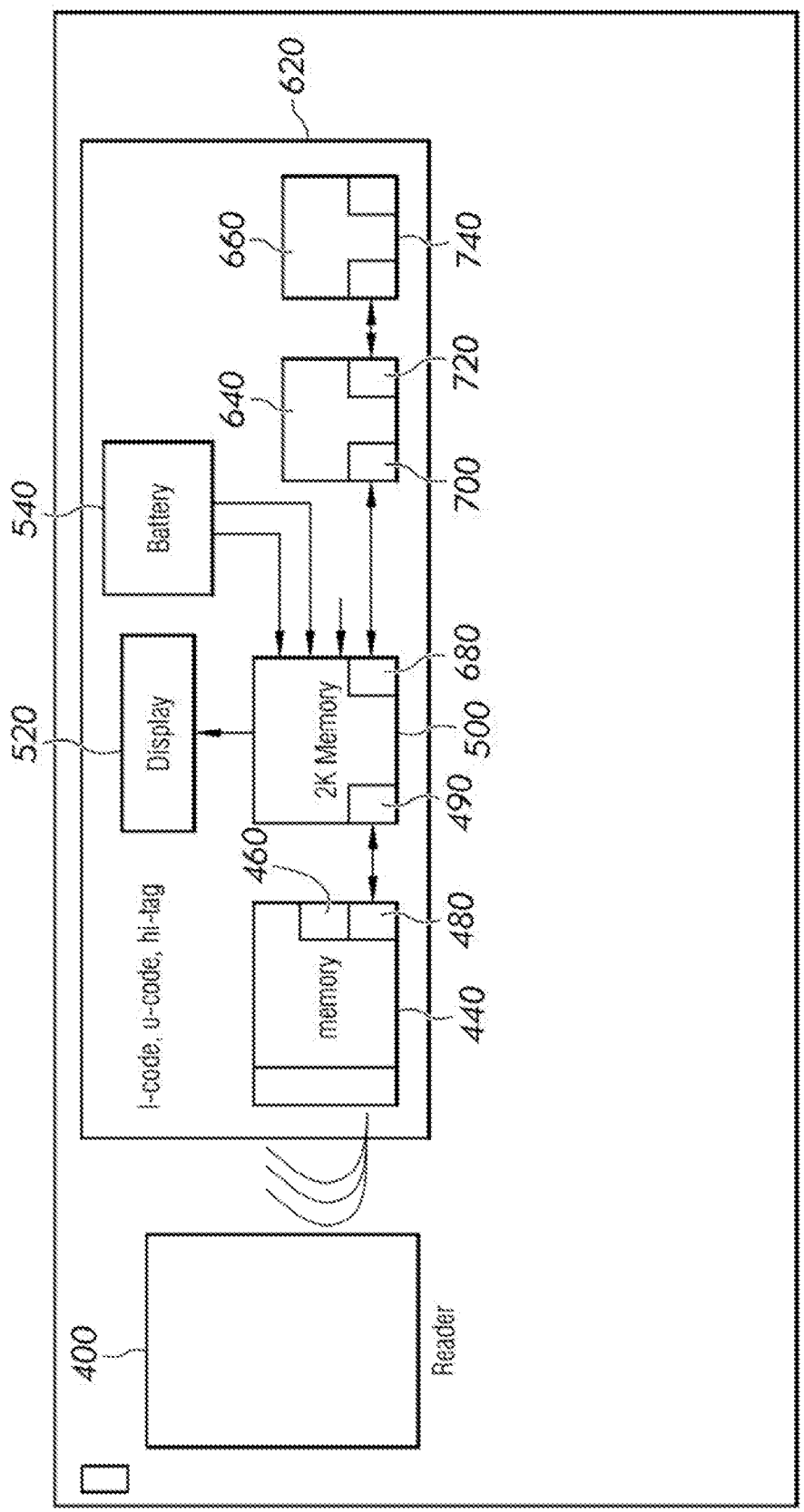
FIG. 14 is a further block diagram illustrating programming components, a modular configuration of memory of an RF sensor coupled together with one or more further sensors in accordance with a preferred embodiment.

An advantage that is illustrated at FIG. 14 is called "inheritance" and is described in more detail below. This feature enables shelf life left from a large container of perishables to be transferred to a tag set up for the same batch/shelf life characteristics. Examples include wine (vat, case, bottle); pharmaceuticals (large container, small container, vial). Inheritance also enables shelf life data to be transferred from a UHF pallet or case tag to an HF item tag. The inheritance feature may also be used for very long-life items, wherein a new tag may be used to replace an old tag that may be at the end of its useful life. Although preferably old tags simply have their data transferred to new tags, an old tag can alternatively be refurbished with new programming, a new battery and even a replacement chip.

The I-FRESH-IC supports an optional display 16 with user button. The display is preferably a printable display 16, is flexible and may be configured for tagging applications on bottles or odd shaped items. The display can represent "fresh/not fresh," "fresh/use now/toss," or can be akin to a gas gauge ranging from "fresh" to "empty". Other common options, including red/green LEDs may apply.

The size of the tag, substrate to which the I-FRESH-IC and the antenna 20 are mounted, the battery life and the optional display are preferably configurable components of the tag. Physical tag size is determined mainly by the antenna 20 and battery 12, which in turn may be selected based on desired accessible distances and lifetimes. The antenna 20 uses with UHF EPC can be as large as 4" by 4". HF antennas in contrast are smaller in size and can fit on a 1"×2" tag or on the top of a bottle cap. The battery 12 may include a 14-day, 190-day, 500-day, 3-year, or 10-year life. These options include a printable battery (thin and flexible) or a button cell. Choice of battery is dependent upon size and nature of the item to be tagged and the shelf life of the perishable.

The sensor-transponder system is preferably configured in accordance with Windows CE-based PDA readers and shelf/desk mountable readers for short distance reading. Additionally, the preferred tags are compatible to industry-standard ISO an EPC portal readers.

Real-time edgeware software is preferably used for readers and networks. The reader software enables readers to input, output, print and communicate shelf life data, alerts, and history. This network software monitors shelf life readers on the network, gathers statistics, checks that the readers are working, provides updates, and manages shelf life data tables. Its web database servers enable those with no supply chain software systems to access shelf life data. It also offers developer toolkits and shelf life fine-tuning software, enables users to manage shipping, manufacturing, inventory, and sales by "least shelf life left".

Customized software is preferably utilized to interface to customer proprietary supply chain software systems. Interfaces to leading supply chain software systems such as Savi and SAP may be used, and special interfaces may be used.

Figure 13:
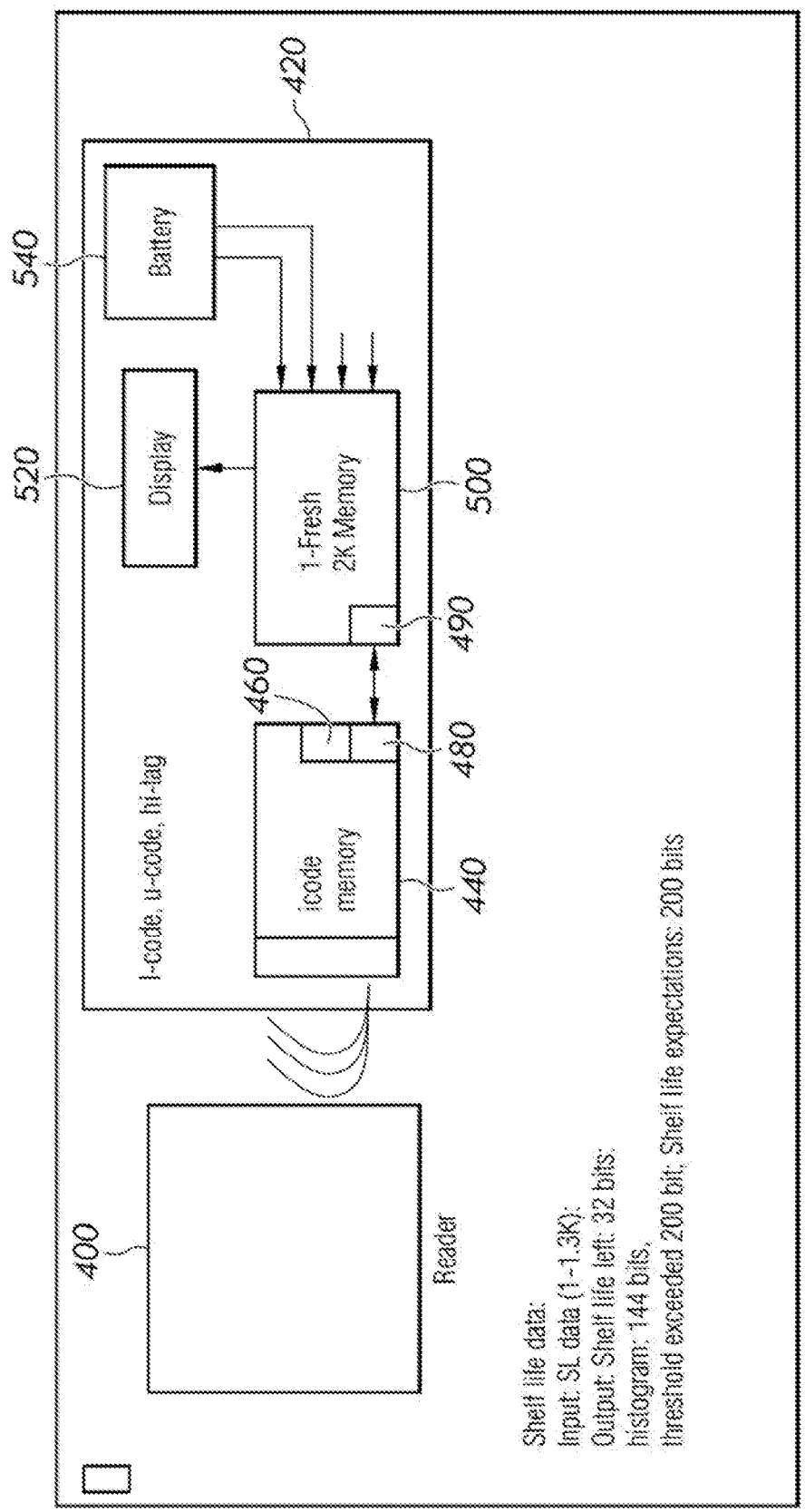
FIG. 13 is a further block diagram illustrating programming components and a modular configuration of memory of an RF sensor in accordance with a preferred embodiment.

FIG. 13 illustrates an RFID reader 400 communicating with a sensor-transponder system 420 in accordance with a preferred embodiment. The sensor-transponder system 420 includes an RFID transponder component 440 that includes a shelf life memory component 460 that is preferably 32 bits. The memory component 460 is accessible by the reader 400 independent of the sensor status, i.e., whether it is asleep or measuring or processing current freshness data. The transponder component 440 includes an interface component 480 for communicating with a corresponding interface 490 of the main sensor memory 500. The display 520 is illustrated as being controlled by the sensor 500, and the battery 540 is illustrated for powering the sensor 500.

Shelf Life and Custody Logs

Over the last twenty years manufacturers, distributors and retailers of perishables have used data loggers to collect temperature data for HACCP documentation and analysis of refrigeration equipment, transportation containers and warehouse air conditioning and refrigeration—flagging when and how long temperature thresholds have been exceeded. At each sensing interval the logger records time of the sensing and temperature—resulting in logger memory commonly ranging in size from 16K-64K bytes. When loggers are used to measure environmental conditions in which items are stored rather than used to monitor tagged items, the large accumulation of historical data is not an issue. However, when temperature loggers using RF as their communication interface are used as tags on perishable items, cases or pallets, the amount of data to be sent from the tag to the RF reader and system databases is massive. The amount of data sent from a tag to a reader affects the number of tags that can be read by an RFID reader as tags pass through a warehouse door and the amount of disk storage involved to save the tag's data.

Additionally, in order for the same log to accommodate a variety of perishables, all with different lives (e.g. fish at 14 days, drugs at year or longer, "meals ready to eat" at three years or more and ammunitions at over five years), the logger's memory needs to be large enough so that sensing data is not dropped when memory boundary of the logger is reached.

In accordance with a preferred embodiment and referring to an exemplary shelf life table illustrated at Table I, integration of temperature and time into a % of shelf life used per sensing interval results in a number representing shelf life left. As the tagged item passes thru an RF controlled warehouse door, this shelf life left number and any user set alerts quickly communicates the item's condition.

TABLE I

| Custody Change | Location # | Shelf Life Left | Elapsed Time (min) | Min Temp | Max Temp |
|---|---|---|---|---|---|
| Mfg stores | 111111 | 100% | 12 | 9.9 | 9.6 |
| Truck | 222222 | 99% | 36 | 9.2 | 18.7 |
|  |  | 99% | 48 | 5.2 | 18.5 |
| Truck | 222222 | 98% | 156 | 4.5 | 5.0 |
| Mfg DC dock | 333333 | 98% | 160 | 4.7 | 5.2 |
|  |  | 96% | 168 | 4.7 | 33. |
| Mfc DC stores | 333444 | 96% | 168 | 3.3 | 29.9 |
|  |  | 95% | 468 | 1.1 | 29.8 |
|  |  | 94% | 780 | 1.2 | 1.4 |
|  |  | 93% | 1080 | 1.1 | 1.2 |
| Transport | 444444 | 93% | 1090 | 1.0 | 1.3 |
|  |  | 92% | 1320 | 1.2 | 1.4 |
|  |  | 91% | 1500 | 1.1 | 1.3 |
| Alert 2 Be at retail DC |  | 90% | 1680 | 1.4 | 1.2 |
|  |  | 89% | 1860 | 3.3 | 4.8 |
| Transport | 444444 | 89% | 1860 | 5.0 | 5.2 |
| Retail DC Dock | 555555 | 89% | 1862 | 5.1 | 5.3 |
|  |  | 88% | 1956 | 5.0 | 5.3 |
|  |  | 87% | 2136 | 5.1 | 5.3 |
|  |  | 86% | 2316 | 5.2 | 5.3 |
| Retail DC Stores | 555566 | 80% | 1864 | 4.9 | 5.2 |
| Alert 3: sell |  | 75% |  |  |  |

History data is also preferably kept. This includes a histogram of temperatures sensed and a shelf life log. The shelf life log preferably records the elapsed time, the maximum temperature and the minimum temperature for each % change in shelf life. This % change (e.g., 1%, 0.5%, 5.0%) can be specified by the user. For example, if the log is set to log at each 1% change in shelf life, the log table has 100 entries (going from 100% to 1%); no matter what the actual life of the tagged item. When temperature abuse occurs most entries in the logs are at the time of the temperature abuse, e.g., occurring because the temperature abuse causes greater percentage decrease in shelf life left. In an alternative embodiment, a mean kinetic temperature log may be kept instead of or in addition to the shelf life log.

The sensor also logs high and low temperature threshold violations and alert data. The result is exception-based reporting that is applicable not only for temperature sensing but for any sensor data that affects the shelf life of an item, has settable alert conditions or has threshold settings—perishable or non-perishable.

Additionally, the sensor preferably updates its log at each change in custody (from inventory to receiving; from manufacturer to transport to retail distribution center to transport to retailer). Notification for the change of custody is sent from an RF reader to the RF transponder memory and then to the sensor. Custody data sent from the reader includes, at a minimum, the time of the change of custody and the location or reader identification number.

The shelf life % used, temperature threshold violations, alerts and changes in custody data require approximately 512 bytes of log memory. When this data is viewed together on one table/chart, the user gets a quick picture of what happened to the item case, or pallet. This is in contrast to an RF logger with its 16k to 64K bytes of temperature data which has to be downloaded to an RF reader, then sent to a computer for analysis.

Inheritance

FIG. 14 illustrates an RFID reader 400 communicating with a further sensor-transponder system 620 in accordance with a further embodiment. There are many further situations in which items are shipped in large containers and throughout the distribution chain are repackaged. The quality of a perishable is affected by the item's temperature history and its perishability curve. Today when batches of pharmaceuticals are split into smaller batches often the "use by" date is lost.

The sensor-transponder 620 includes the components 440, 480, 490, 500, 520 and 540 described previously with respect to the embodiment of FIG. 13. The system 620 includes the further feature that additional smart sensors 640 and 660 are "daisy-chained" together with the system 620. Freshness status data from the memory 500 not only to the RFID reader accessible memory 440, but also to the additional sensors 640 and 660 by interfaces 680, 700, 720 and 740.

Freshness status data, shelf life data including output shelf life data and other programming are contained in and/or are transferred to the additional sensors 640 and 660. The additional sensors 640, 660 may be detached from the main sensor 620. The additional sensors 640,660 can then be attached to separated items from a bundle that the main sensor 620 was and may continue to be attached to. The additional sensors 640,660 may be configured only for retaining the freshness status data obtained from the main sensor 620 and may be more completely configured to continue to sense the freshness of the separated items to which they are now attached. The additional sensors may only have a display for providing freshness status, are may be further configured so that the freshness data may be accessed by an RFID reader. The additional sensors 640, 660 may also be re-attached to the same or another main sensor module 620. In this embodiment, the additional sensors 640, 660 may preferably utilize the RFID transponder, battery, display and memory capabilities of the main sensor 620, and simply carry and transfer the freshness status data upon re-attachment.

This inheritance feature enables shelf life data to be transferred to another shelf life tag or additional sensors 640, 660. The new tag or additional sensors 640,660 is/are configured with the same shelf life tables or perishable data tables as the main sensor memory 500. Not only is the shelf life left but also an audit trail identifying the EPC number of the mother tag 620 are each preferably transferred to the daughter tag(s) 640, 660. Particular applications include wine and pharmaceuticals.

FIG. 15 illustrates another embodiment of a sensor-transponder system. In this embodiment, a sensor component 80 and memory component 820 are separate modules that connect and/or communicate via interfaces 840, 860. The sensor component includes the memory 500, display 520 and battery 540, while the memory component 820 includes memory 440 and components for communicating with RFID reader 400.

Another embodiment of the sensor-transponder system is for shelf life data representing % of shelf life left, the time of last shelf life reading, a calculated new expiration date based on the last shelf life and/or estimated time left before use to be communicated to a printed label.

ALTERNATIVE EMBODIMENTS

RF output of digital sensors is an alternative to the more commonly implemented serial interfaces for sensors. A radio frequency or infrared band can be substituted as a communication interface for a one-wire bus for communicating temperature and shelf life (see, e.g., U.S. Pat. No. 6,122,704, hereby incorporated by reference).

A wireless tag may be attached to an item communicating to a reader such as is described at U.S. Pat. No. 6,285,282, hereby incorporated by reference.

A timing module may be included that permits a user, upon interrogating an RFID tag, to determine the precise length of time from the previous charge of the RFID tag and how an environmental sensor can be used in conjunction with timing module (see, e.g., U.S. Pat. No. 6,294,997, hereby incorporated by reference).

Any of various ways may be selected for communication of wireless sensor data and communication to a remote reader. Various ways may be used for interfacing the sensor to a non-sensor RF transponder for the purpose of communicating sensor data to the RF transponder and ultimately to a reader. The RF transponder then communicates the sensor data to an RF reader. For example, European Patent No. EP 0837412 A2, hereby incorporated by reference, describes memory mapping of special functions like the read out of sensor data.

In addition, a display system and memory architecture and method for displaying images in windows on a video display may be used for displaying freshness status (see, e.g., U.S. Pat. Nos. 4,823,108 and 5,847,705, hereby incorporated by reference). Further features may be described at U.S. Pat. Nos. 5,237,669; 5,367,658; 6,003,115; 6,012,057; 6,023,712; 6,476,682; 6,326,892; 5,809,518; 6,160,458; 6,476,716; 4,868,525; 5,963,105; 5,563,928; 5,572,169; 5,802,015; 5,835,553; 4,057,029; 4,277,974; 3,967,579; 6,863,377; 6,860,422; 6,857,566; 6,671,358; 6,116,505; 5,193,056; 6,217,213; 6,112,275; 6,593,845; 6,294,997; 6,720,866; 6,285,282; 6,326,892; 6,275,779; 4,857,893; 6,376,284; 6,351,406; 5,528,222; 5,564,926; 5,963,134; 5,850,187; 6,100,804; 6,025,780; 5,745,036; 5,519,381; 5,430,441; 4,546,241; 4,580,041; 4,388,524; 4,384,288; 5,214,409; 5,640,687; 6,094,138; 6,147,605; 6,006,247; 5,491,482; 5,649,295; 5,963,134; 6,232,870; and 4,746,823, U.S. Published Patent Application No. 2002/0085453, and/or sensor interface spec 1451-4, and/or at the background, invention summary, and brief description of the drawings, and are all hereby incorporated by reference.

An independent display may broadcast an RF signal continuously within a perimeter of, e.g., ten feet, for energizing a responsive packaging device that signals back its perishability status. The signal may be a mark along a gas gauge type device or a yes/no LED or OLED or PLED. A single dot may represent the polled package. The independent display may be attached to a counter, a wall, a shelf, a refrigerator, a pallet, etc. This allows a substantial reduction in power and cost in monitoring the shelf life of the package. The display may work in conjunction with other means to selectively poll an individual package. The package may be individually switched on or off to avoid conflicts with other polled responses. The display may search out other indicia to identify the individual package, make a list of such, and append the perishability status to the list.

Shelf life is an integration over multiple temporal periods of a spoilage rate curve that varies as a function of temperature and/or other environmental conditions such as humidity, vibration, direct exposure to contaminants or oxidation, etc. Preferably, as least two clocks, one for measuring time and one for measuring temperature, are used. Tables may be used that take these into consideration, thereby providing a shelf life accuracy that can be tuned for particular items. Shelf life accuracy is thereby provided over the life of the perishable within advantageously 1% in critical ranges. This accuracy is dependent upon the consistency of the clocks. Tables may be calibrated and loaded with just clock tick data (representing temperature), to provide a temperature monitor.

Life left in the battery may be determined based upon a number of shelf life samples. For example, log RF may read and display hits. This may be advantageous for determining battery status. At the end of a shelf life, a tag may go dormant, so that as to battery life, the tags may be reused with the remaining battery life that was saved due to the tag going dormant when the shell life has expired. The shelf life left may be represented as a percentage of shelf life. This may be kept in the chip very accurately and yet may be a smaller percentage when sent to a reader for alert purposes. The tag may be effectively an exception reporter, and as such may provide alerts and pinpointing of exceptions.

The tag may be an item tag for foods and pharmaceuticals, among other perishable items. Reference data that enables an audit trail may be provided in the tag. Once the tag is started, preferably no data (shelf life, use by alert, history and shelf life left) is to be changed by a user, although alternatively, a tag may be configurable as desired under certain circumstances. A reason not to permit modification of data is that inheritance of data (especially for beyond use dates) may provide audit trail ability. The preferred embodiment includes a smart sensor with RFID interface. Memory for shelf life data and history is preferably separate from RFID memory. Interfacing is preferably via a sensor bus to RFID chip. This enables interfacing to multiple vendor RFID implementations and multiple RF frequencies.

A "command-driven" architecture or a "memory map" may be used. Data sizes of different fields may be defined. A sample size may be 14 bits. Sampling may occur every 12 minutes or longer, and a lifetime may be five years or more. RFID readers may be provided with the software that recognizes RFID tags. A real time middleware or betweenware solution may interpret the data and may be able to print the data.

A table may be used wherein preferably less than 2 k bits of memory uses an advantageous communications protocol arrangement. Either of EPC/UHF Class1V2—256 bits of memory AND ISO HF I-Code may be used. Philips ISO U-Code HSL, ISO U-Code EPC 1.19, EPC Class 1 Gen2 or ISO I-Code chip may be used. The Software may be implemented in chip and with RFID reader A 32-bit memory block of which 8 bits represents a command and 24 bits data may be used. There may be no READ/WRITE command in chip, so the reader may write to the chip to tell it what it wants next. Memory addresses may be used over 8 k that the chip is not using, e.g., the number of addresses may be 128. The reader may, in this case, just read blocks of memory that are assigned address numbers to data in tag. Often an address will include only 8 bits. For either of these options, the memory layout for the design may be 32 bits on the tag or less. A Quick Alert area may be updated after each temperature sensing. It may include a command name in the case of the 8-bit command/24-bit data option. Data may be input into chip at either assembly of the tag or at the perishable producer.

Figure 5:
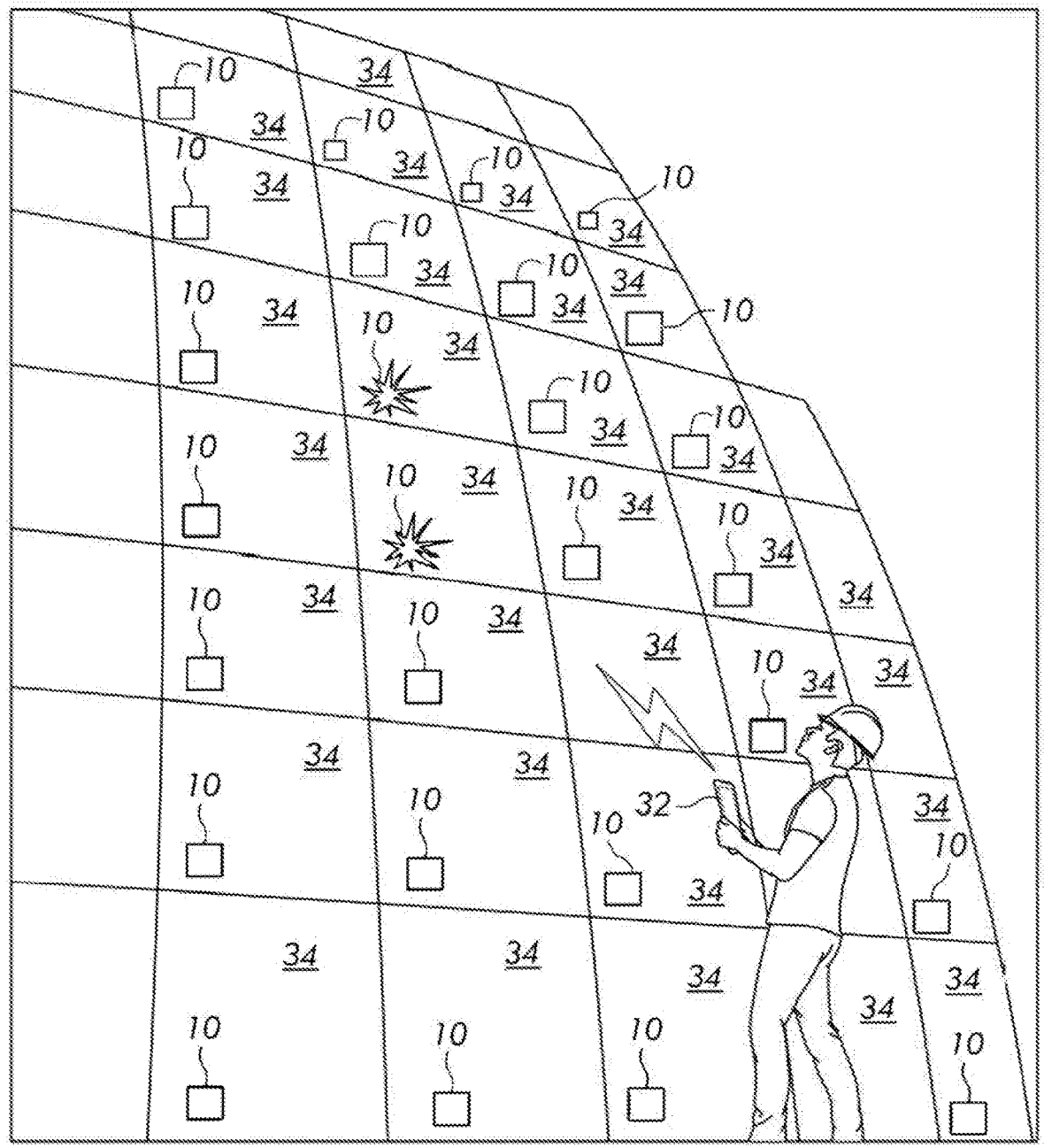
FIG. 5 illustrates a user using an RFID sensor to locate a particular container according to one embodiment of the invention.

Exemplary data sizes are provided as follows:
Clock tick data=384 bits (16 bits; 24 table entries)
Delta (shelf life data)=384 bits (16 bits, 24 table entries)
Unique identifier=assumed most on wafer; serial number (64 bits); could be on wafer.
An EPC number (optional) for use by perishable producer for inheritance or on standalone tags to identify perishable=96 bits
Device configuration data=about 128 bits
Histogram data=320 bits
Shelf life and custody logs=512 bytes In operation, the smart labels 10 may be used to selectively and remotely locate a particular item or container and obtain data relating to that item or container. FIG. 5 shows a collection of containers 34 that may reside, for example, in a storage facility or warehouse. In this example, a user 30 having an RFID 32 reader can quickly and easily locate a particular container. The user 30 enters into the reader 32 an RF identification command (e.g., a "where are you?" command), which is associated with the RFID corresponding to the item that the user would like to locate. Reader 32 transmits the identification command via an RF signal toward the collection of containers 34. The RFID devices 18 in smart labels 10 receive the RFID signals including the identification command. The specific RFID device corresponding to the identifier can detect the command and activate in response. The RFID devices not associated with the particular identifier take no action. The sensor 10' that is coupled to the activated RFID device detects the command and/or the activation of the RFID device and, in response, sends a command to indicator/switch 18. The command causes indicator/switch 18 to flash and/or illuminate and/or in the case of an audible indicator, to generate an audible tone. The flashing display 18 and/or audible tone allow the user 30 to visually and/or audibly locate the desired item. In one embodiment, the sensor 10' will also communicate its freshness data in response to detecting the command. For example, the command may cause the sensor 10' to activate in the following manner: i) flash in a predetermined manner (e.g., a location sequence) to allow a user to locate the container/item; ii) pause for a predetermined period of time; and iii) flash in a manner that communicates freshness data and/or item information. In an alternate embodiment, a user 30 may enter a separate command into the RFID reader 32 to cause the sensor 10' to display its freshness information. Alternatively, when the smart label is enumerated by the RFID signal, the sensor module may choose at random one of the visual signaling schemes or may be instructed by the RF reader which visual signaling scheme to use. The smart label may then send sensor data to a conventional visual receiver or vision system in the visual communication scheme chosen. By using signaling schemes, the vision reader can handle partial or zero visual data. It should be understood that the particular examples discussed in this paragraph are in no way limiting and any suitable command, command sequence and/or command structure can be used to trigger a particular sensor 10' or its associated item and/or container, and to communicate data regarding the item.

The visual/audible indicators of the foregoing embodiments may also enable visual and audio communications to replace or supplement RF communications by using signaling schemes to transmit data either to a user or to a special reader, such as one or more conventional vision systems, photodetectors, pattern detectors, luminance detectors, or sound detectors. For example, a visual signal may comprise a flash of a dot or a sequence of flashes of a suitable length of time sufficient for a vision system to read the data. This data can communicate descriptive features of an item or condition, such as data the percentage of remaining shelf life (100%, 85%, 50%), specific alert conditions (temperature has exceeded 8° C. for 20 sensing periods), and the like.

Visual data that a vision system receives may be converted and/or reformatted so that it is compatible with data received from the perishable indicator by an RFID reader. For example, the conversion may allow the visual data to be incorporated into the supply chain and cold chain information systems used by RF readers. This visual data may be noted as visual data received, such as the ID of the visual receiver, location, time and other information tracked in RFID systems.

The visual/audible indicators of the foregoing embodiments further enable visual and audio communications to be initiated by an RF command sent to the perishable indicator by an RF reader to either locate a tagged item or to initiate a visual/audio communication link for the purpose of transmitting data to and from the perishable indicator. Data transmitted to the sensor can be shelf life data about an item to be tagged, information about a shipment, a batch lot number, quality inspection data or change of custody information. Data transmitted from the perishable indicator can be a temperature or shelf life log or other sensor data collected by the sensor such as humidity.

In one embodiment, a smart label 10 may be adapted to respond to and communicate with an RF reader that is shared at a checkpoint for invoicing, billing or the like. The items-passing through the reader might be prompted by the reader to communicate their freshness data to the reader. A textual, colored, or shaped indicia of shelf life, being either a symbol or index of such, could be added to line items regardless of Uccnet or EAn or ECP Global or other codes. In this manner, by viewing a checkout or an inventory display screen, the reader display, or a summary paper receipt, an ordinary employee or end customer could view the "freshness" or perishability of various items. Such an additional readout in the case of perishables permits an additional benefit in the perception of merchandise quality. In one embodiment, this read out may be used in lieu of a visual tag display to reduce the need for power to operate a tag display (or the cost per label or tag in having an operating individual item self-powered display on each item), while still providing an RFID-cued indication of freshness. Alternatively, the smart labels passing through the readers may be prompted to communicate their freshness data via their respective displays.

Figure 6:
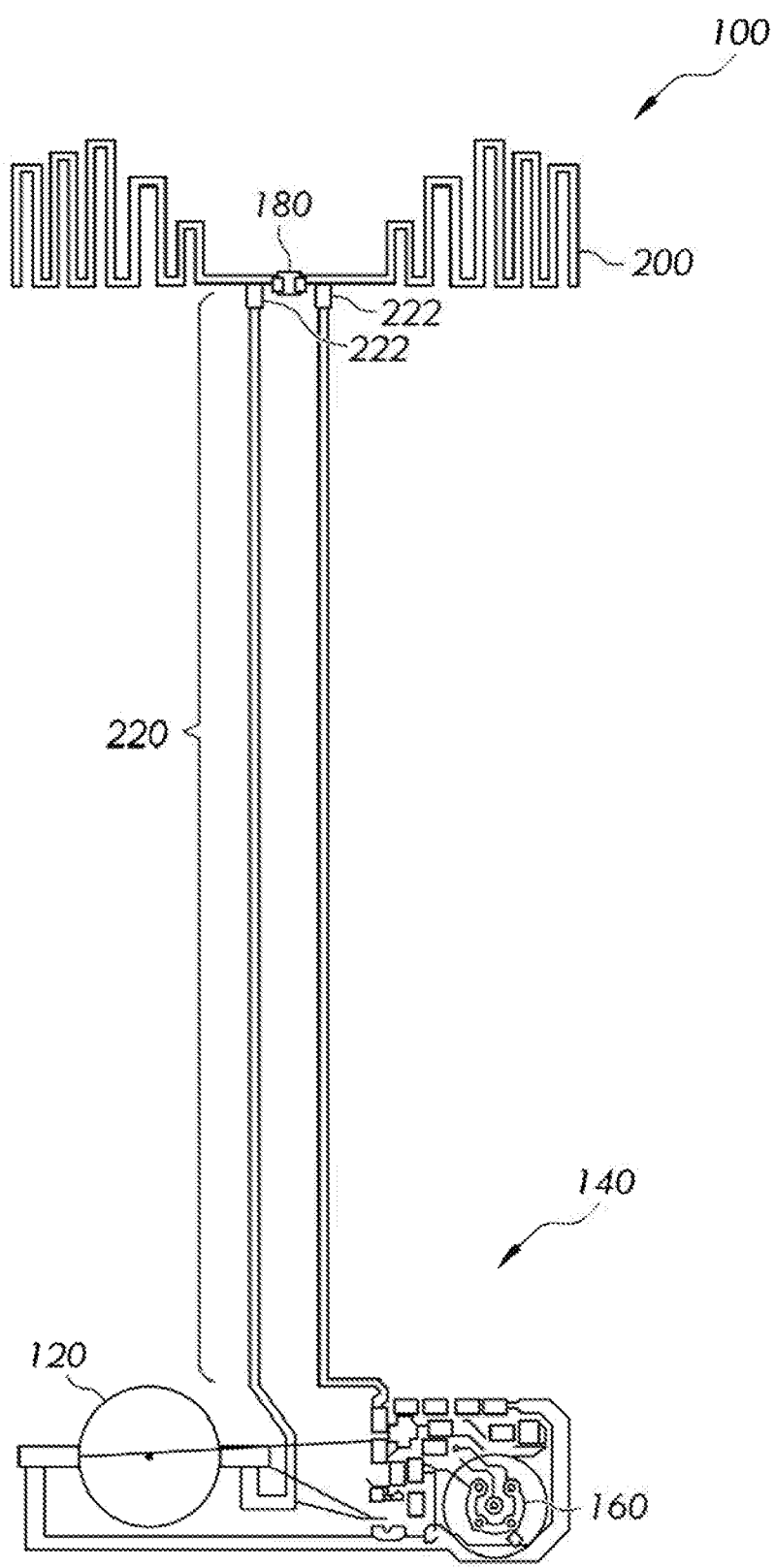
FIG. 6 illustrates one embodiment of an extended smart label or "long tag" that includes an extended interface between the antenna/RFID device and the sensor module, according to the present invention.
Figure 7:
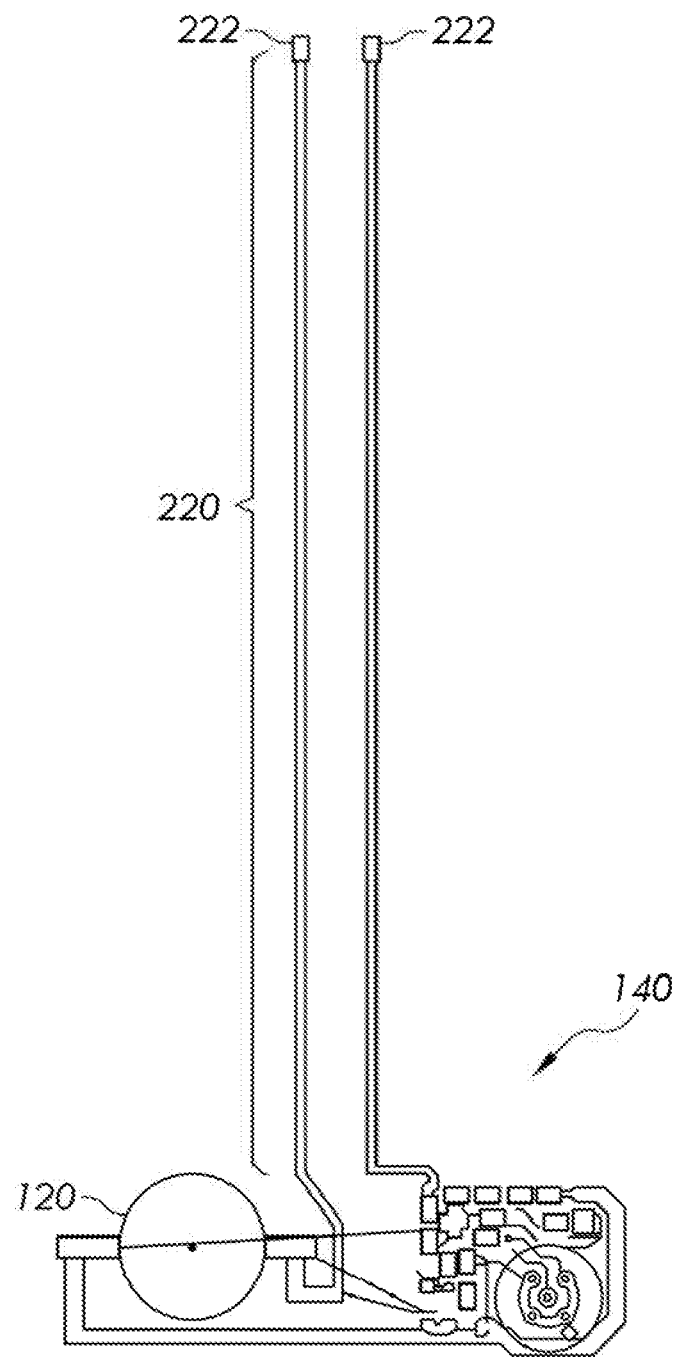
FIG. 7 illustrates an embodiment of an extended smart label or "long tag" that includes an extended interface that can be attached to an antenna/RFID device, including a pair of inductors.
Figure 8:
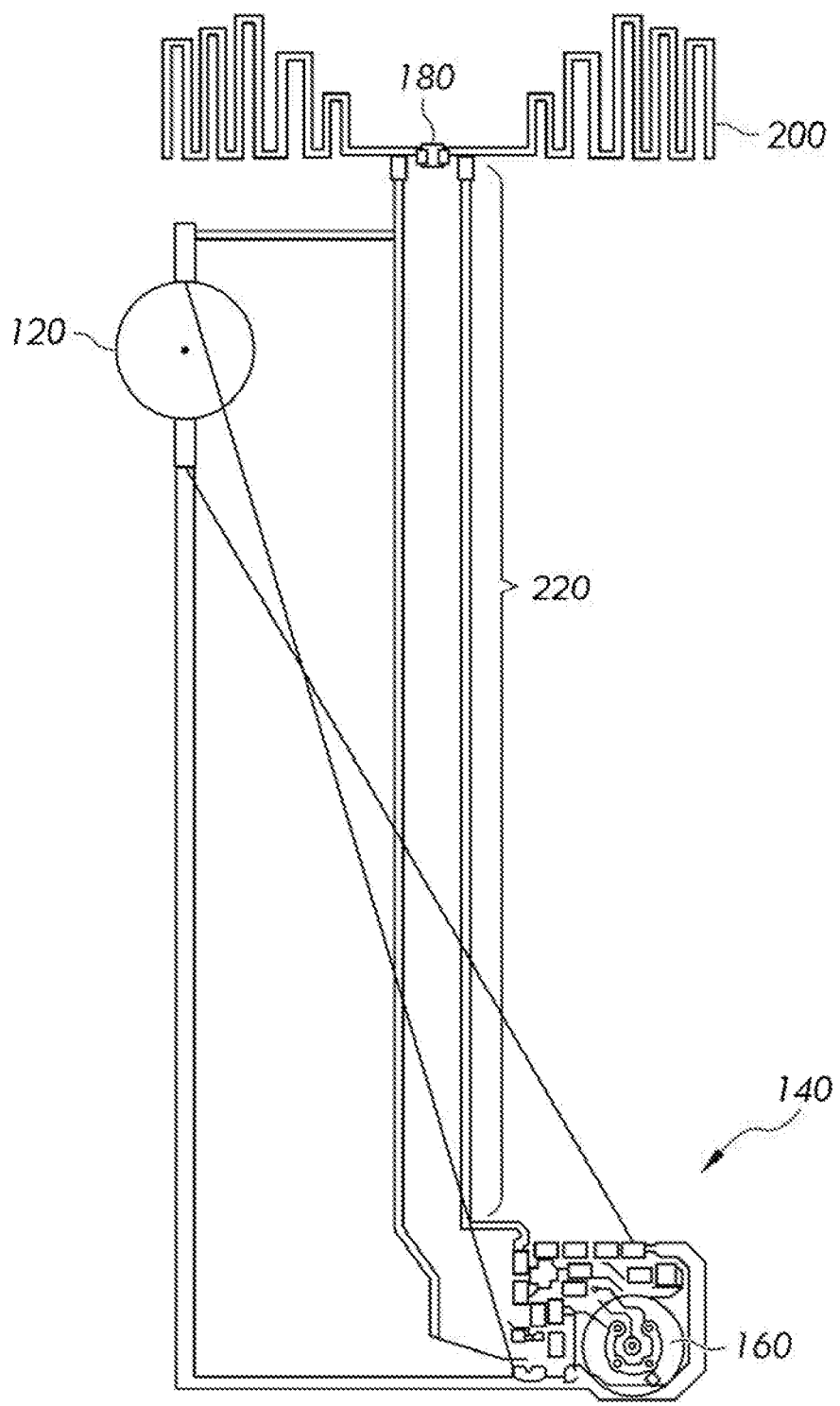
FIG. 8 illustrates another embodiment of an extended smart label or "long tag" that includes an extended interface between the antenna/RFID device and the sensor module, according to the present invention.

FIGS. 6-8 illustrate further embodiments of the inventions, which implement an elongated or extended antenna interface. FIG. 6 shows a smart label 100 including an extended antenna interface 220, which is used to connect the sensor 110 to the RFID chip 180 and antenna 200. The smart label 100 includes a power supply or battery 120, a sensor module 140, and an indicator/switch 160. The sensor module 140 is coupled to and receives electrical power from battery 120, which may comprise a coin cell, flexible battery or other relatively thin power supply. The sensor module 140 may include sensor logic, such as a conventional processor chip and/or circuitry, a memory module for storing data, such as data related to a perishable item freshness data, or data representing one or more predefined temperature-dependent shelf life trends, and a sensor component adapted to sense and/or detect temperature and/or other item parameters. In alternate embodiments, the sensor module 140 may use external memory, such as the memory contained in an RFID device, to store item data and sensor measurements. The sensor module 140 and RFID chip 180 may be substantially similar in structure and function to sensor module 14 and RFID chip 18, respectively.

The indicator/switch 160 may be communicatively coupled to the sensor module 140 and may receive electrical power from battery 120. The indicator/switch 160 may include a LED, OLED, LCD, light or other visual, audio or otherwise humanly perceivable sensory indicator for providing information regarding a monitored item and/or the "freshness" of the item that is being monitored. For example, the indicator/switch 160 may comprise a multi-colored display (e.g., LED or LCD) adapted to generate a different color based on a particular signal. In one embodiment, the indicator/switch 160 may also include a conventional electrical or capacitive switch for selectively activating the display and/or the sensor module 140, for example, by manually depressing the indicator/switch 160. The indicator/switch 160 may be substantially similar in structure and function to indicator/switch 16 described above.

The smart label 100 includes an elongated or extended antenna interface 220 for communicatively coupling the module 140 to RF transponder 180. The elongated or extended antenna interface 220 is preferably formed using a thin, flexible substrate, which in one embodiment may comprise polyester. In one embodiment, the entire smart label 100 is formed on the flexible substrate. The extended antenna interface 220 can be about several inches to about 10 feet or more in length. Initial labels 100 have been made with example lengths of 10 inches, 24 inches and 30 inches. In one embodiment, the tag is covered front and back with label stock comprising a flexible material, such as paper, tyvec, polyester or the like. The back of the tag may also include an attachment material, such as double-stick tape, Velcro, adhesive or the like at one or both ends. The extended antenna interface 220 includes a pair of inductors 222 that couple the interface to the antenna 200.

In one embodiment shown in FIG. 7, the sensor module 140 and antenna interface 220 are formed separately from the RF transponder 180 and antenna 200. In this embodiment, the sensor module 140 may be selectively and communicatively coupled to the RF transponder by attaching the antenna interface 220 to an RFID antenna 200. This coupling is made using inductors 222. The inductors 222 allow the sensor circuit to connect to the antenna we without detuning it and absorbing energy. The inductors 222 present increasing resistance (impedance) to current flow as the frequency increases (e.g., at low frequency the inductor is like a short circuit at high frequency it is like an open circuit)—so at UHF the inductors act like an open circuit and isolate the antenna 200/RFID chip 180 from the sensor module 140.

In another embodiment shown in FIG. 8, the smart label 100' includes a battery 120 that is disposed in relative close proximity to the antenna 200 and remote from the sensor module 140. In this embodiment, the sensor module 140 can be placed in a container while both the battery 120 and antenna 200 reside outside of the container. This allows for extended battery life, for example, when a thermally cooled container is used. In another embodiment, the display/switch 160 can also be disposed in relative close proximity to the antenna 200 and remote from the sensor module 140.

In the embodiments shown in FIGS. 6-8, the extended interface 220 allows the sensor module 140/140' to signal directly to the RFID chip 180 to update RF memory in the chip. The interface also allows the module 140 to detect the incoming RF data so it knows when not to communicate with the RFID chip 180. The inductors allow for signaling the RFID chip because the frequency required to do this at is only a few tens of kilohertz and at this frequency the inductors look like short circuits. This allows the module to see the RFID chip through the inductors at low frequencies, while the UHF RF frequencies are blocked by the same inductors. Detecting the incoming RF is also possible because the chip produces a varying low frequency signal, which is resolvable at the antenna and again passes through the inductors. The inductors can be formed as a separate or integral component. For example, the inductors can be designed as a coil etched/printed directly on the substrate or be built as a micro strip inductor.

Figure 9:
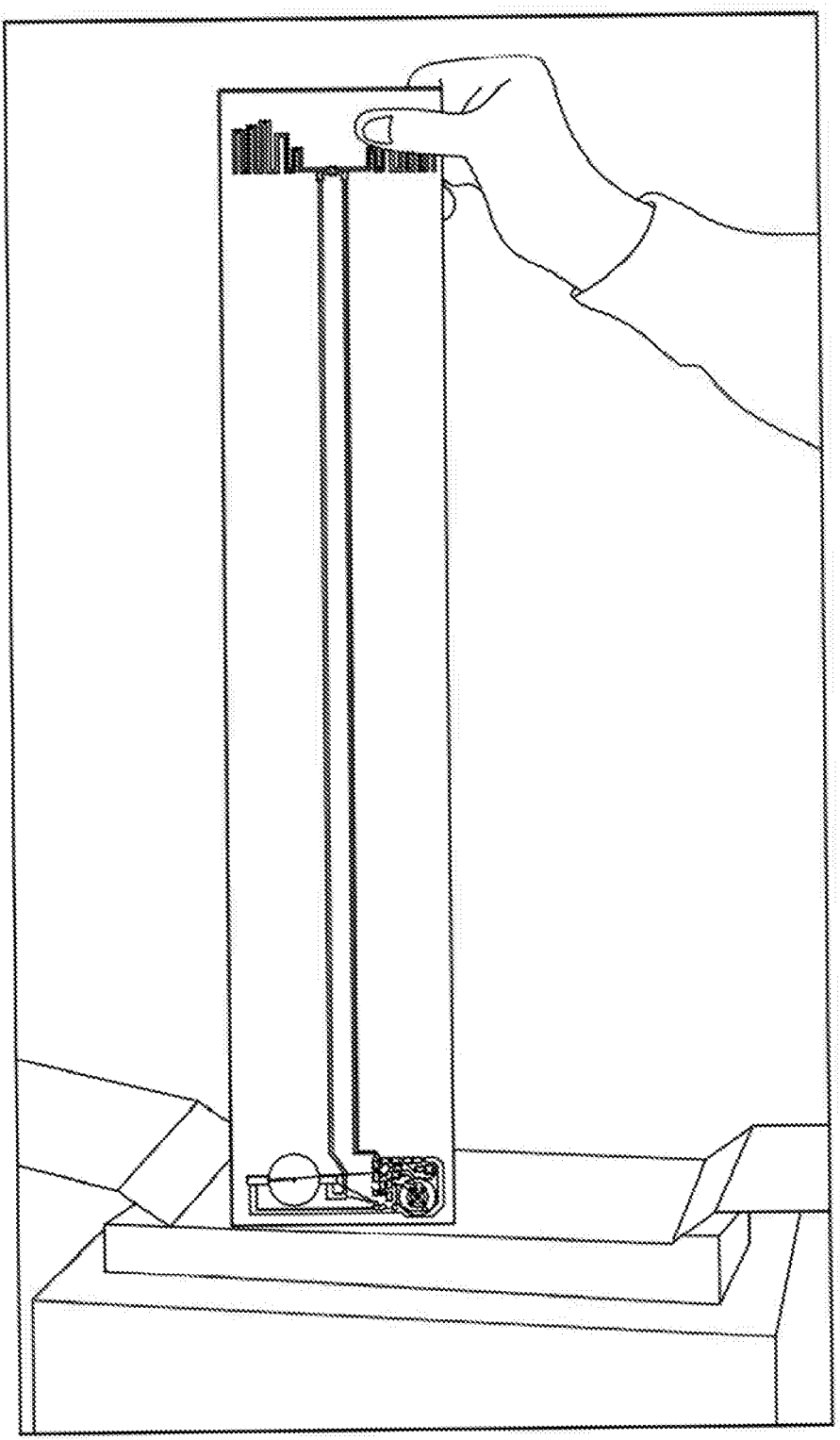
FIG. 9 illustrates the extended smart label or "long tag" shown in FIG. 7 being placed into a container.

In operation, the sensor end of the smart label 100, 100' is placed in the container at the desired location. FIG. 9 shows a smart label 100 being inserted into a container. Once inserted into a container the elongated antenna interface 220 may extend up the inside wall of the container and over the top of the case so that the antenna 200 and RFID chip 180 are located outside of the container. The thin, flexible interface 220, allows the lid to be placed on the container and seal the container. The antenna end of the tag may be attached to the outside wall of the container using the tape, adhesive or Velcro®.

The elongated smart label 100 is particularly useful in applications where it is desirable for the sensor to be inside the package. Placing the sensor module inside a package, such as a cold box, while allowing the antenna to reside outside of the package provides various advantages. For example, and without limitation, the long tag allows for optimal sensing and RF reception when used together with temperature sensitive goods that are placed in a container lined with metal and/or containing ice or dry ice packs, which could reduce RFID read performance. In one embodiment, the power supply or battery is placed near the antenna, remote from the sensor module. This allows the battery to reside outside of a container, thereby eliminating risk that cold or freezing temperatures cause battery voltage to drop. Additionally, a long tag could be used to sense the temperature of cases located in the middle of a pallet.

It should be understood that the inventions described herein are provided by way of example only and that numerous changes, alterations, modifications, and substitutions may be made without departing from the spirit and scope of the inventions as delineated within the following claims.

What is claimed is:

1. A condition monitoring system comprising a radio-frequency ("RF") condition monitoring device comprising:
   an RF transponder module comprising an RF transponder integrated circuit;
   at least one monitoring module for monitoring one or more sensors, said at least one monitoring module comprising an electronic device;
   a first memory and a second memory communicatively coupled to said RF transponder module and said at least one monitoring module, respectively;
   a two-way communication interface between said first memory and said second memory;
   wherein one or more memory addresses in said first memory are operative to store at least one of status and other data about a monitored item from said at least one monitoring module and to receive at least one of data, addresses, and commands sent by an RF reader to said RF transponder integrated circuit for the at least one monitoring module;
   wherein said first memory is operative to store data sent to or received from said second memory by way of said two-way communication interface and said second memory is operative to store data sent to or received from said first memory by way of said two-way communication interface;
   wherein said first memory is operatively responsive to route at least one of data and commands from said RF reader to memory addresses in at least one of said first memory and second memory by way of said two-way communication interface;
   a condition determining module for calculating a condition status of one or more monitored items; and
   a condition control module comprising said RF reader operative to communicate with said RF transponder module under software control to control data sent to or received from memory addresses of said first memory or second memory of said RF condition monitoring device.

2. The condition monitoring system according to claim 1, wherein the item monitored is one of:
   a perishable,
   a device; or
   an item having a measurable condition.

3. The condition monitoring system according to claim 1, wherein the item monitored is:
   an environment in which one of a perishable,
   a device; or
   an item resides,
   said environment having at least one condition which can be measured.

4. The condition monitoring system according to claim 1, wherein the condition status comprises:
   at least one of a sensor value;
   an excursion of said sensor value from a sensor of the one or more sensors or a time threshold value;
   a life remaining of said item as expressed in time, a life remaining of said item in time at a specified sensing value, or a life remaining as expressed as a percentage of estimated life;
   a life used as expressed in time, a life used in time at a specified sensing value, or a life used as a percentage of estimated life;
   a number of measured occurrences of a sensing in a specified elapsed time;
   a time or life until a future event; or
   a visual or audio status of an item by a user or an audio-visual system.

5. The condition monitoring system according to claim 1, further comprises an audio-visual communication interface, under control of said electronic device, for supplementing or replacing said two-way communication interface:
   said audio-visual communication interface using at least one audio or visual signaling scheme to transmit and/or receive data between said RF condition monitoring device and a user or audio-visual system,
   said audio-visual system comprising at least one of:
   a photodetector;

a pattern detector;
a luminance detector;
a sound detector; or
another vision or audio system.

6. The condition monitoring system of claim 5, further comprises an indicator communicatively coupled to said monitoring module, said indicator comprising at least one of:
an LED;
an OLED;
an LCD;
an infrared;
a light; or
a vision, an audio or otherwise humanly perceivable sensor indicator for providing information regarding a monitored item, and further comprising;
an electrical or capacitive switch for selectively activating the indicator and/or the monitoring module.

7. The condition monitoring system of claim 6, wherein said indicator further comprises:
one or more signaling schemes, based upon:
at least one of pulse length and pattern that generate:
a time domain pulse sequence;
Morse code; or
a coding algorithm, to receive or transmit data about a condition of an item.

8. The condition monitoring system of claim 7, wherein said condition control module receives data from said audio-visual system, associates said data with sensor data collected by said RF condition monitoring device; and stores said data in at least one of:
said RF condition monitoring device,
said condition control module; or
a network or web database.

9. The condition monitoring system according to claim 1, wherein said RF transponder integrated circuit is operative to support at least one of:
RF identification ("RFID"),
low frequency ("LF"),
RFID high frequency ("HF"),
RFID ultra high frequency ("UHF"),
Bluetooth,
Zigbee; and
an RF air interface protocol.

10. The condition monitoring system according to claim 1, wherein said RF transponder integrated circuit is at least one of:
a passive,
a battery assisted passive;
or an active RF transponder.

11. The condition monitoring system according to claim 1, wherein said at least one monitoring module is operative to:
receive a signal directly from said RF reader by way of the two-way communication interface; and
to transmit monitored data directly to said RF reader.

12. The condition monitoring system according to claim 1, wherein said RF transponder integrated circuit comprises a one-wire or a two-wire serial interface.

13. The condition monitoring system according to claim 1, wherein said electronic device is a microprocessor.

14. The condition monitoring system according to claim 1, wherein said electronic device of said at least one monitoring module is operative to initiate RF communication.

15. The condition monitoring system according to claim 1, wherein said RF condition monitoring device comprises a single chip.

16. The condition monitoring system according to claim 1, wherein said electronic device of said at least one monitoring module comprises:
software for at least one of controlling sensor setup and operations,
an audio and visual management,
a power management,
a data and memory management; and
a communication interface management.

17. The condition monitoring system according to claim 16, wherein said data and memory management software comprises:
programming components for controlling one or more functions of the one or more sensors, including:
a digital control function,
a reading and writing control function; and
an access control function, and
is operative to transmit data to and receive data from said first memory by way of said two-way communication interface.

18. The condition monitoring system according to claim 17, wherein the digital control function, the reading and writing control function, and the access control function are operative to:
transmit data directly to said first memory or said second memory of the RF transponder and the at least one monitoring module.

19. The condition monitoring system according to claim 17, wherein said data and memory management software is operative to:
determine at least one of sensor status, said sensor status comprising:
current sensor readings at a user determined sensing interval,
alerts that compare measured data with preset alerts rules; and
a life used or left based on at least one of life predetermined trend tables and algorithms.

20. The condition monitoring system according to claim 1, further comprises:
at least one second condition monitoring device;
wherein said second condition monitoring device is operative to:
receive data about a condition of a monitored item from the RF condition monitoring device.

21. The condition monitoring system of claim 20, wherein the RF condition monitoring device and the at least one second condition monitoring device are formed on a common substrate in spaced-apart positions and are communicatively coupled, for calculating a status of:
one or more monitored items,
storing the status in the second memory; and
storing the status in the first memory of the RF condition monitoring device and the at least one second condition monitoring device.

22. A method of operating the condition monitoring system of claim 1, comprising:
storing in said first memory commands and/or data from said RF reader relating to:
one or more monitored items;
storing in said second memory data and/or commands from said first memory relating to:
said one or more monitored items;
calculating a status of said one or more monitored items in said second memory;
storing in said second memory said calculated status of said one or more monitored items;

storing in said first memory the calculated status from said second memory related to:
said one or more monitored items; and
transmitting to said RF reader the calculated status.

\* \* \* \* \*